US012750185B2

(12) United States Patent
Lee et al.

(10) Patent No.: US 12,750,185 B2
(45) Date of Patent: Sep. 29, 2026

(54) METHOD AND DEVICE FOR POSITIONING IN WIRELESS COMMUNICATION SYSTEM

(71) Applicant: LG ELECTRONICS INC., Seoul (KR)

(72) Inventors: Jeongsu Lee, Seoul (KR); Kijun Kim, Seoul (KR); Hyunsoo Ko, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 289 days.

(21) Appl. No.: 18/289,864

(22) PCT Filed: May 11, 2022

(86) PCT No.: PCT/KR2022/006753

§ 371 (c)(1),
(2) Date: Nov. 7, 2023

(87) PCT Pub. No.: WO2022/240195

PCT Pub. Date: Nov. 17, 2022

(65) Prior Publication Data

US 2024/0275548 A1 Aug. 15, 2024

(30) Foreign Application Priority Data

May 11, 2021 (KR) ........................ 10-2021-0060855

(51) Int. Cl.

*H04L 1/00* (2006.01)
*H04L 5/00* (2006.01)
*H04W 64/00* (2009.01)

(52) U.S. Cl.

CPC ........... *H04L 5/0051* (2013.01); *H04W 64/00* (2013.01)

(58) Field of Classification Search

CPC ..... H04L 5/0051; H04L 5/0053; H04L 5/005; H04L 1/0018; H04L 5/0048; H04W 64/00;

(Continued)

(56) References Cited

U.S. PATENT DOCUMENTS

2019/0052996 A1* 2/2019 Sahai .................... H04W 24/10
2022/0150865 A1* 5/2022 Cha ......................... G01S 5/011
2023/0269696 A1 8/2023 Lee et al.

FOREIGN PATENT DOCUMENTS

EP 3965347 3/2022
KR 10-2020-0034736 3/2020

(Continued)

OTHER PUBLICATIONS

PCT International Application No. PCT/KR2022/006753, International Search Report dated Aug. 19, 2022, 4 pages.

(Continued)

*Primary Examiner* — Tanmay K Shah
(74) *Attorney, Agent, or Firm* — LEE, HONG, DEGERMAN, KANG & WAIMEY

(57) ABSTRACT

A method for transmitting information on measurement of a positioning reference signal (PRS) by a terminal in a wireless communication system, according to an embodiment of the present specification, comprises the steps of: transmitting a message for requesting a measurement gap; receiving configuration information related to the measurement gap; receiving the PRS on the basis of the measurement gap; and transmitting information on the measurement of the PRS. The information on the measurement of the PRS is transmitted on the basis of a preconfigured resource.

11 Claims, 17 Drawing Sheets

(58) Field of Classification Search
CPC ..... H04W 72/21; H04W 24/10; H04W 24/08; H04W 72/232; Y02D 30/70
USPC ........................................................ 455/456.1
See application file for complete search history.

(56) References Cited

FOREIGN PATENT DOCUMENTS

| | | |
|---|---|---|
| KR | 10-2020-0039784 | 4/2020 |
| KR | 10-2020-0100004 | 8/2020 |
| KR | 10-2020-0105506 | 9/2020 |
| WO | 2020-221042 | 11/2020 |
| WO | 2022-030963 | 2/2022 |

OTHER PUBLICATIONS

Moderator (Intel Corporation), "Email discussion summary for [98-bis-e][219] NR_MG_Part_2," R4-2105846, 3GPP TST-RAN WG4 Meeting #98-bis-e, Electronic Meeting, Apr. 2021, 87 pages.

European Patent Office Application Serial No. 22807842.4, Search Report dated Jun. 5, 2025, 14 pages.

European Patent Office Application Serial No. 22807842.4, Search Report dated Oct. 6, 2025, 15 pages.

LG Electronics, "Discussion on latency and efficiency enhancement for NR positioning," R1-2100711, 3GPP TSG RAN WG1 #104-e, e-Meeting, Jan. 2021, 8 pages.

VIVO, "Discussion on potential positioning enhancement," R2-2006567, 3GPP TSG-RAN WG2 Meeting #111 electronic, E-Meeting, Aug. 2020, 7 pages.

* cited by examiner

【FIG. 1】
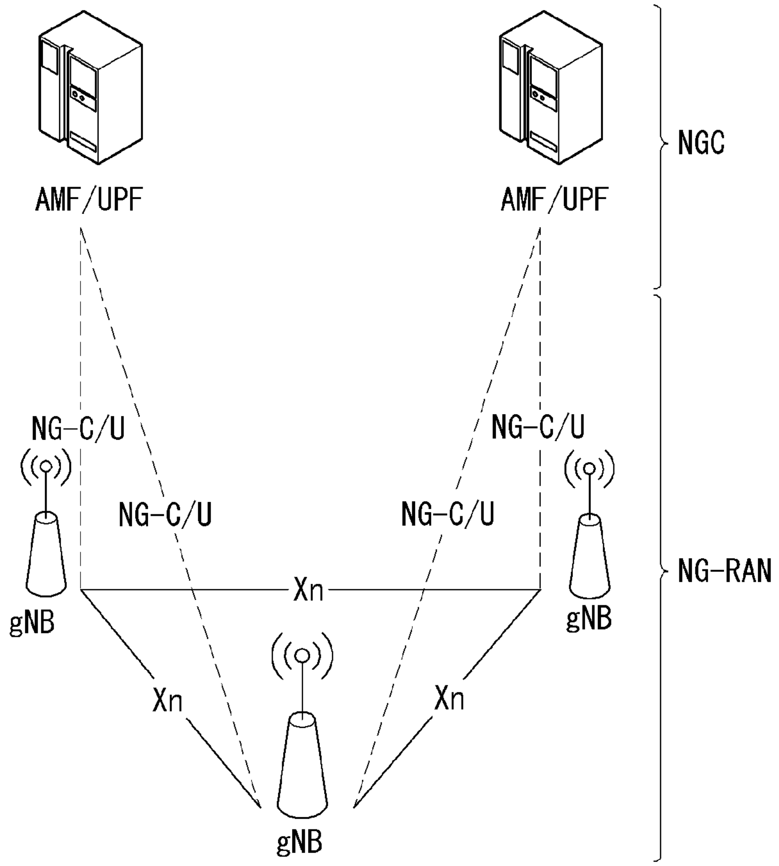
【FIG. 2】
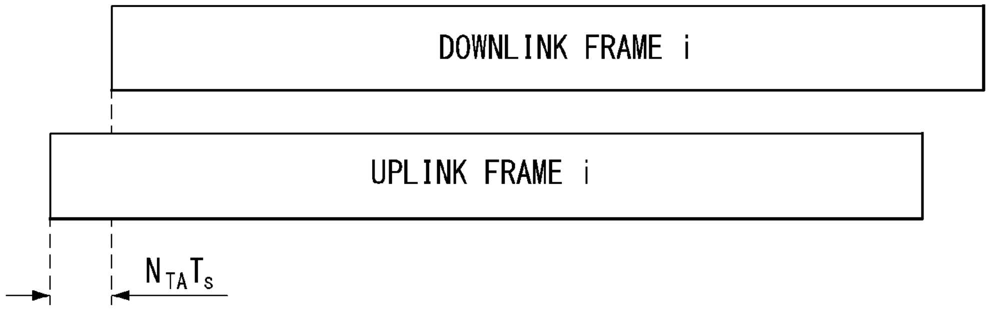

【FIG. 3】
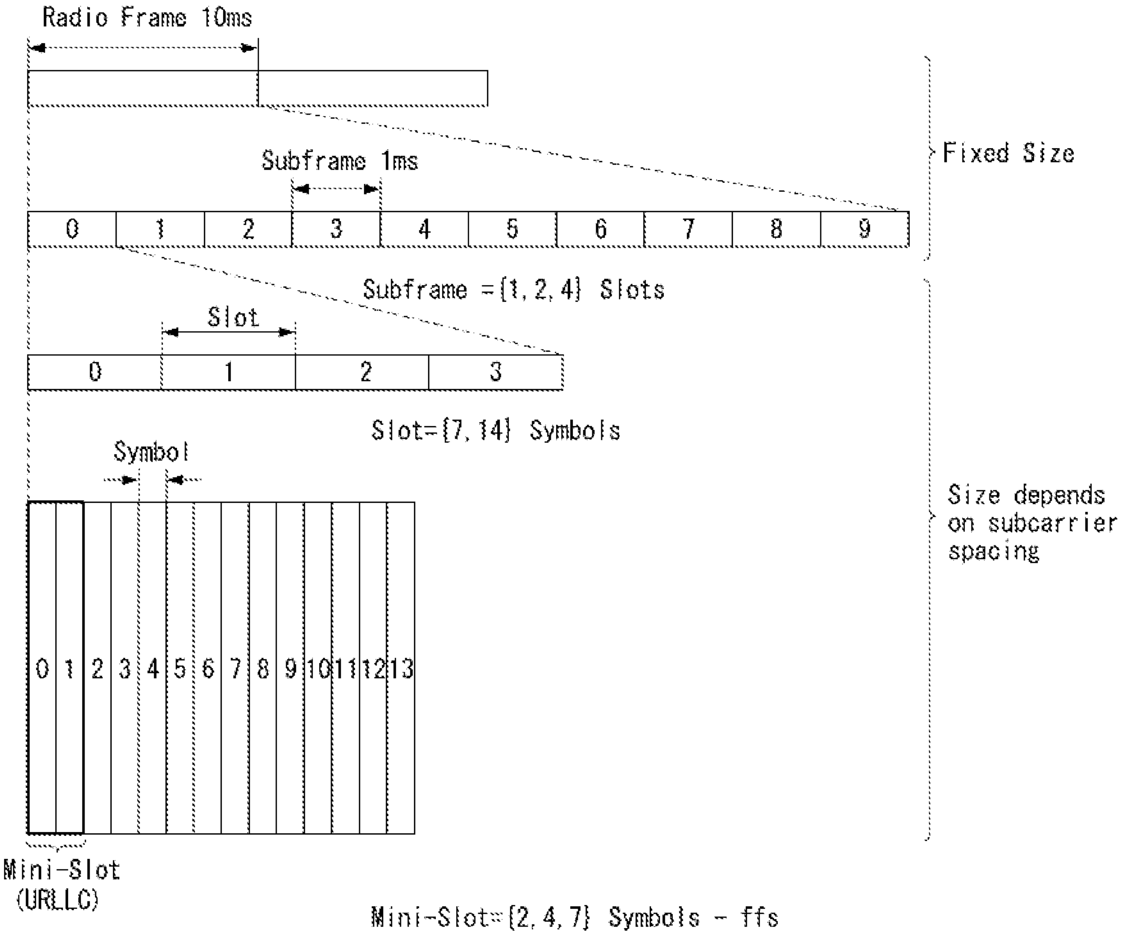

【FIG. 4】
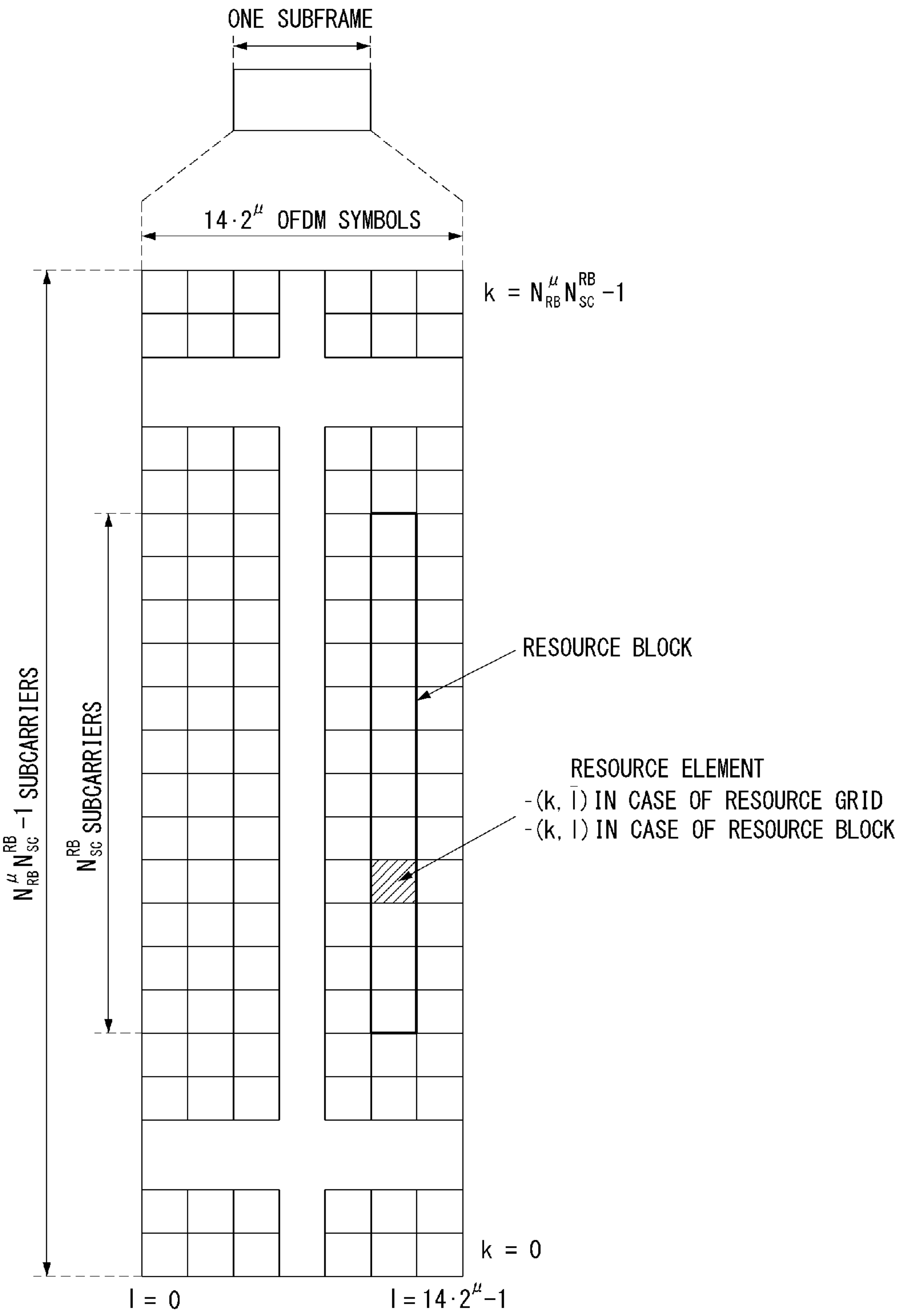

【FIG. 5】
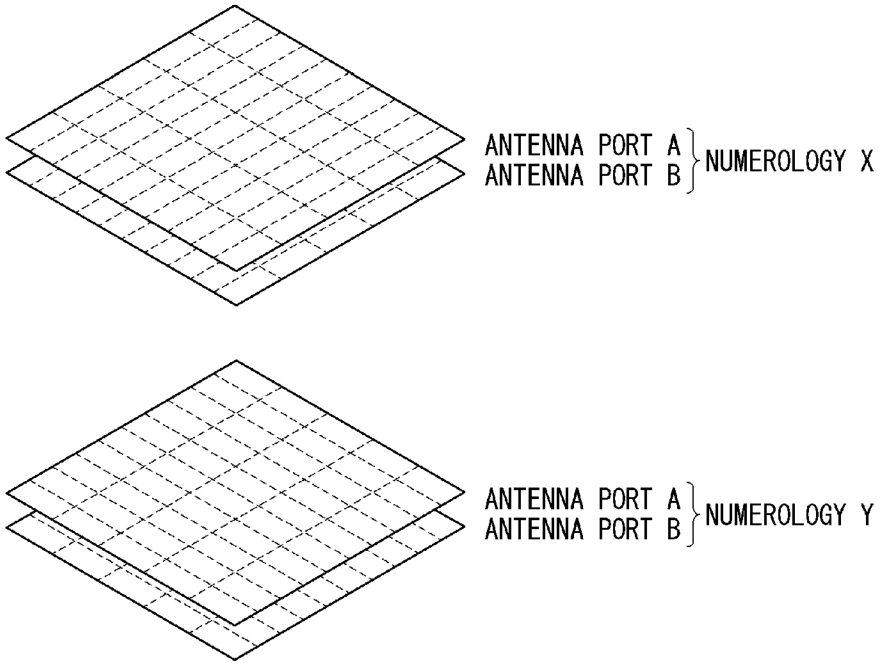
【FIG. 6】
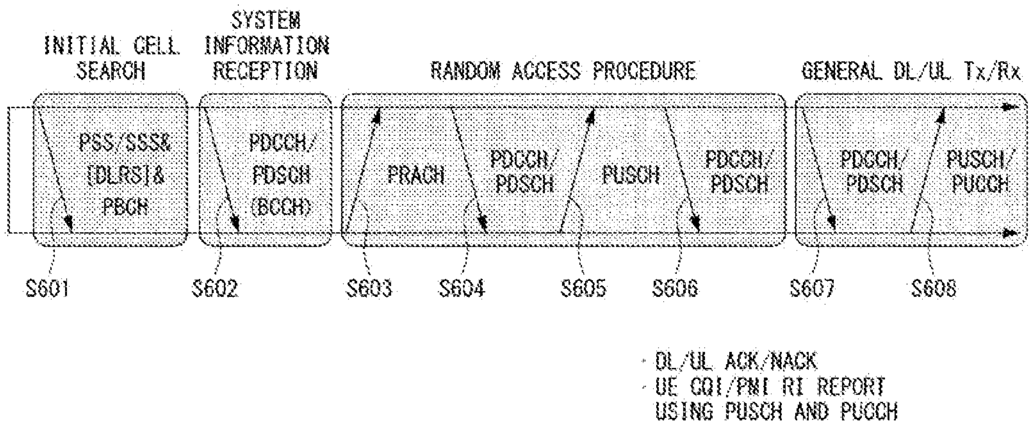

【FIG. 7】
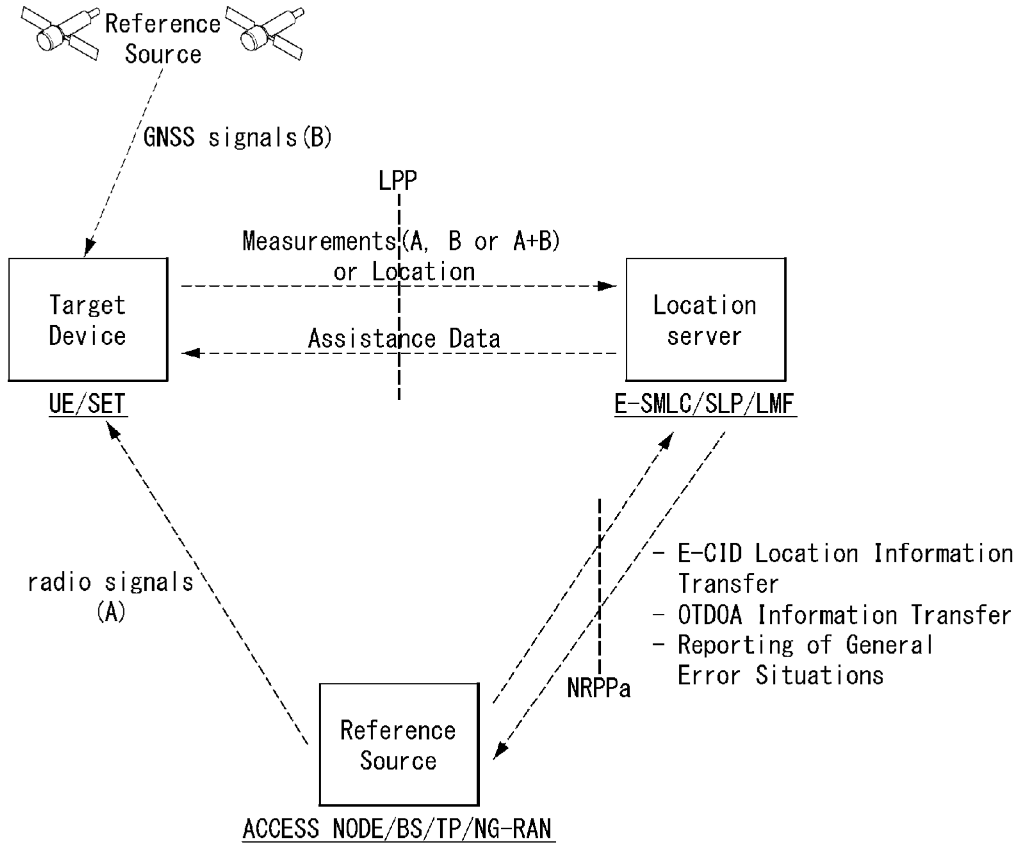
【FIG. 8】
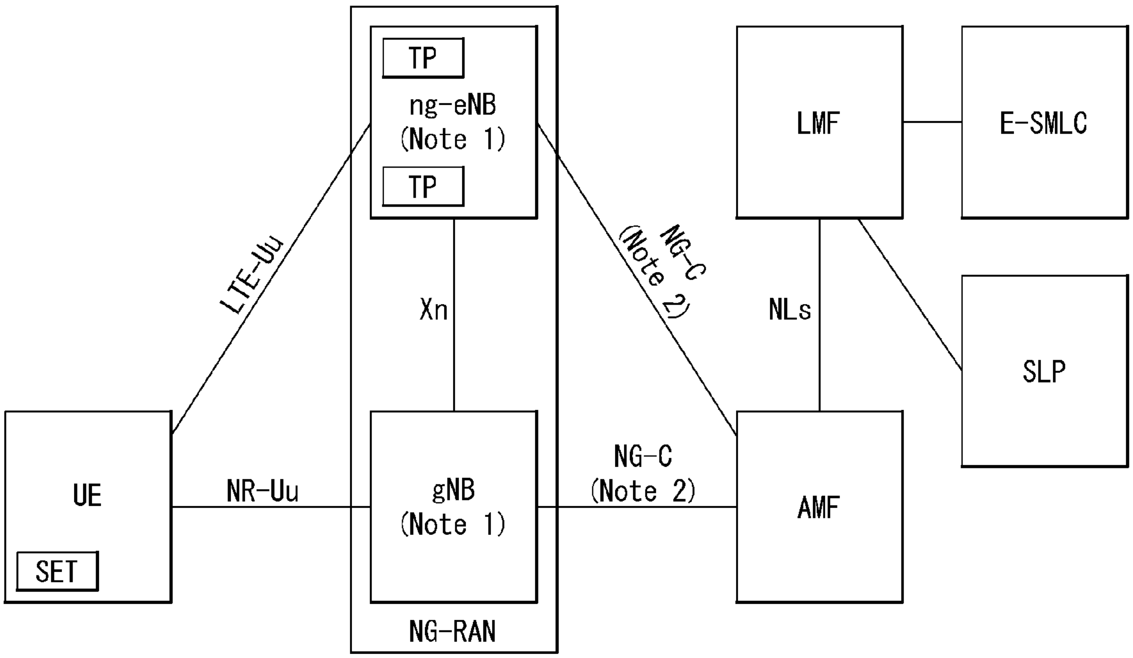

【FIG. 9】
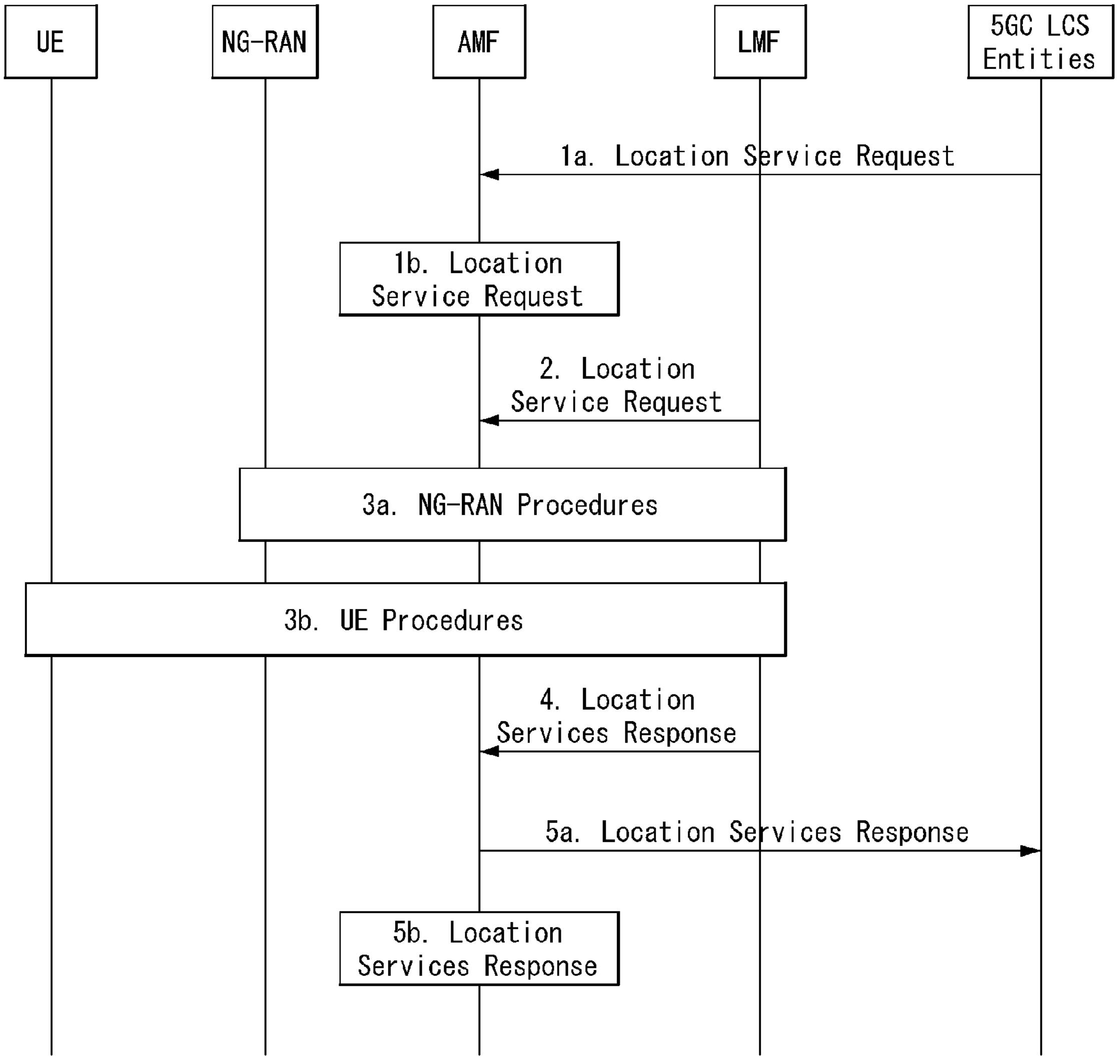

【FIG. 10】
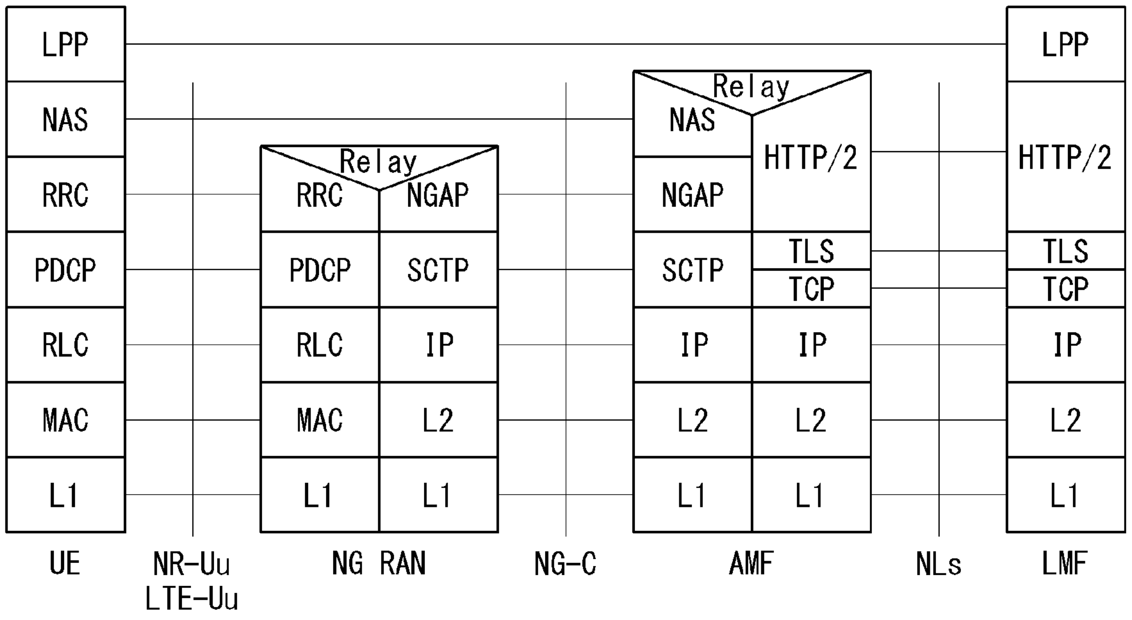

【FIG. 11】
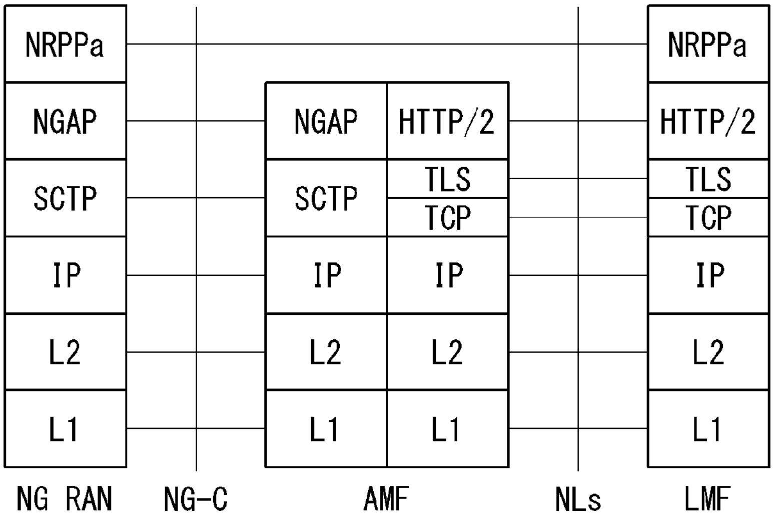
【FIG. 12】
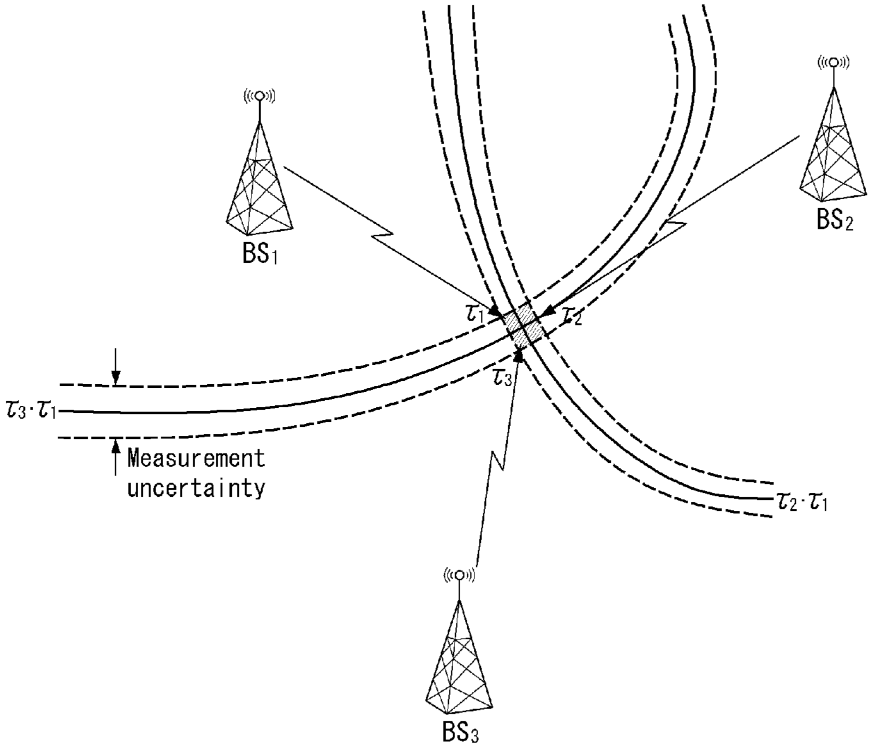

【FIG. 13A】
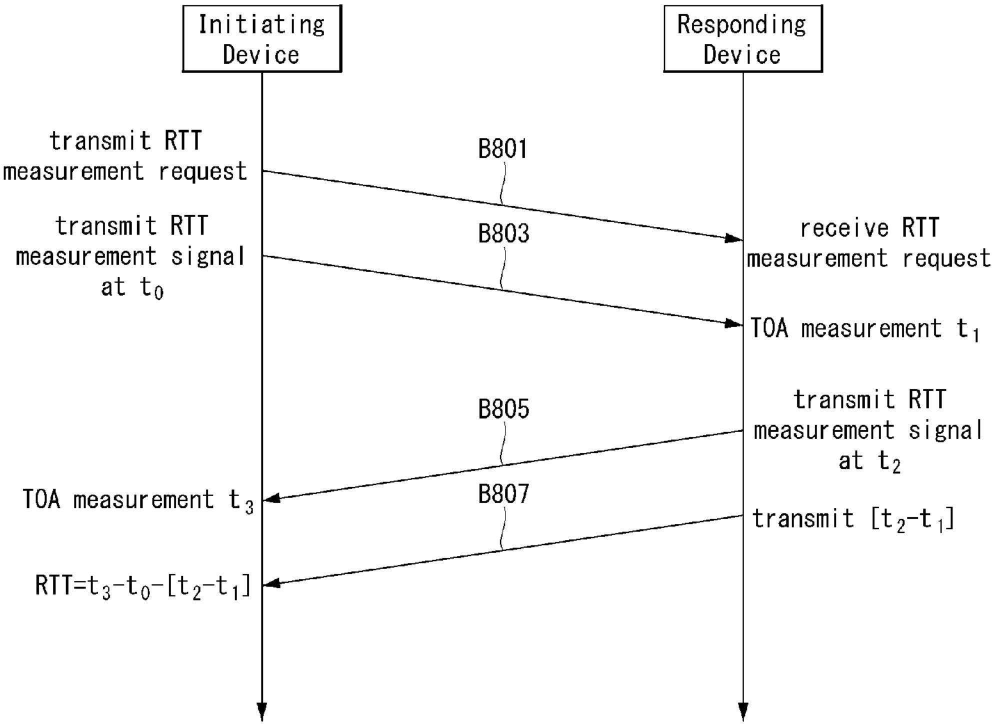
【FIG. 13B】
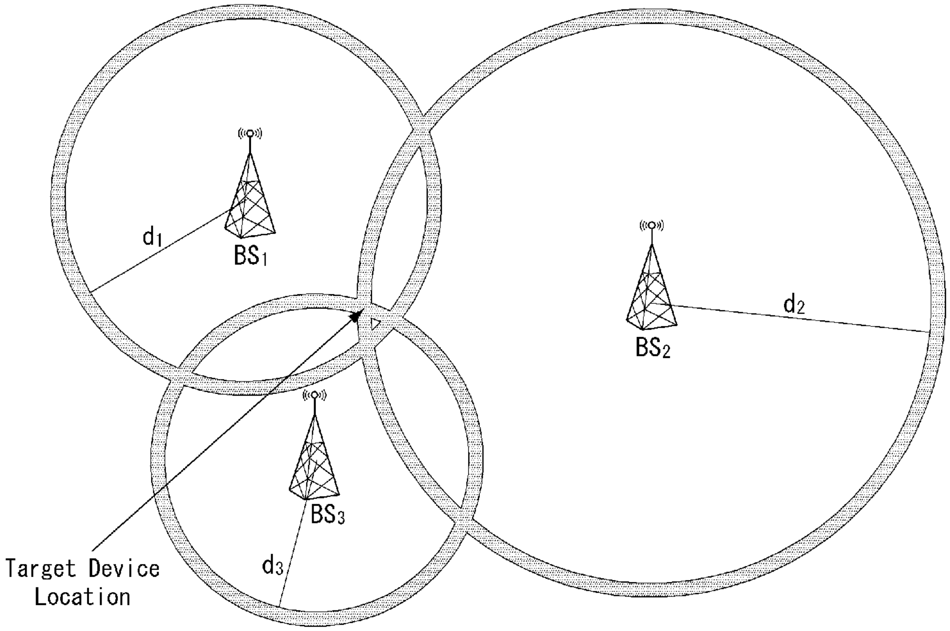

【FIG. 14】
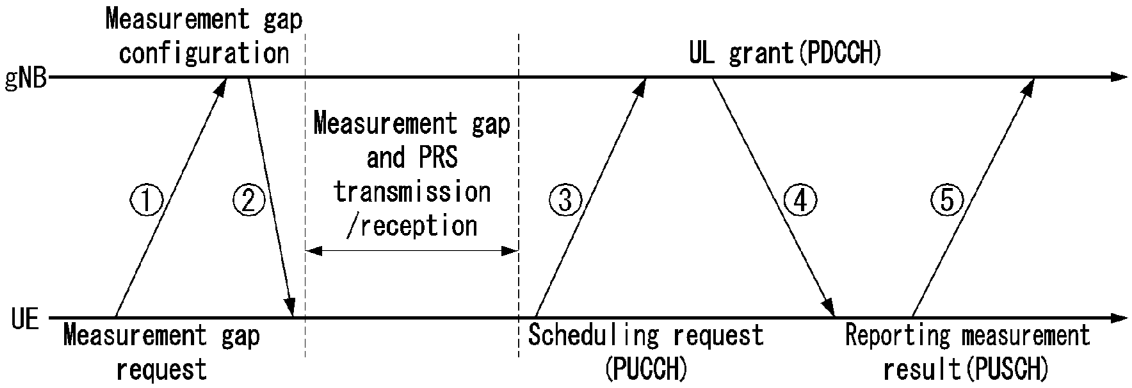
【FIG. 15】
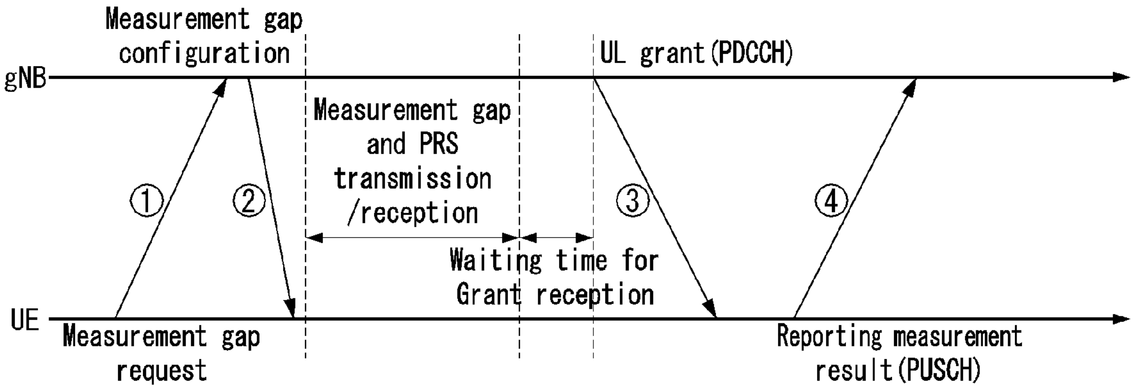

【FIG. 16】
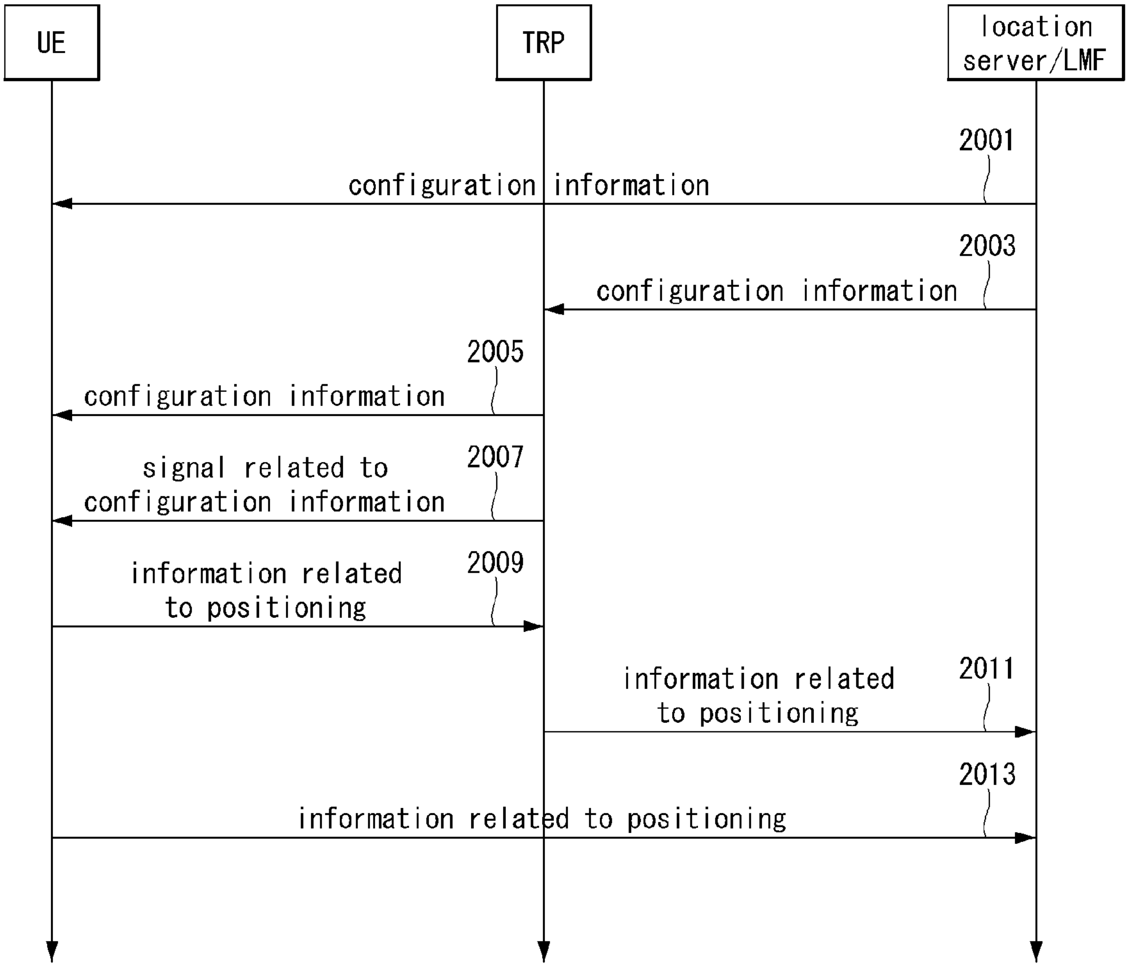

【FIG. 17】
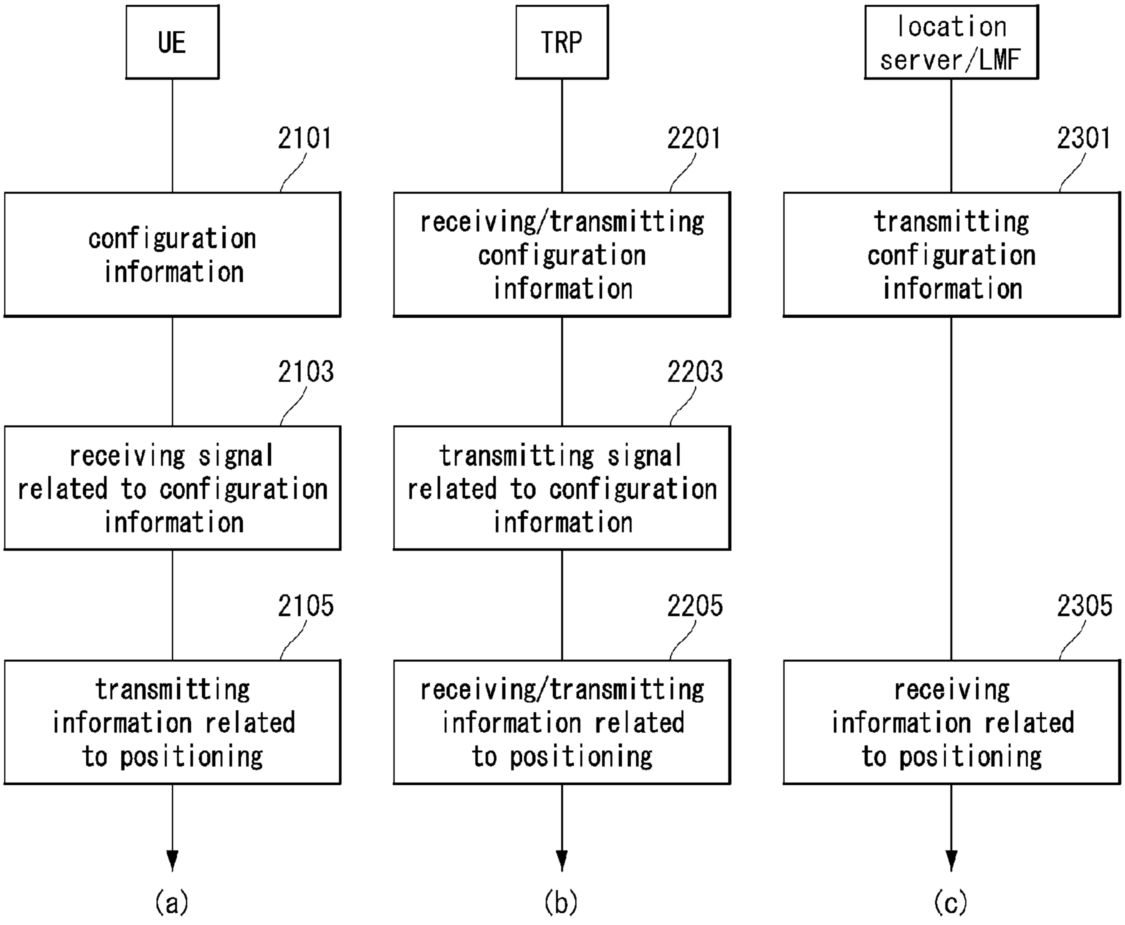

【FIG. 18】
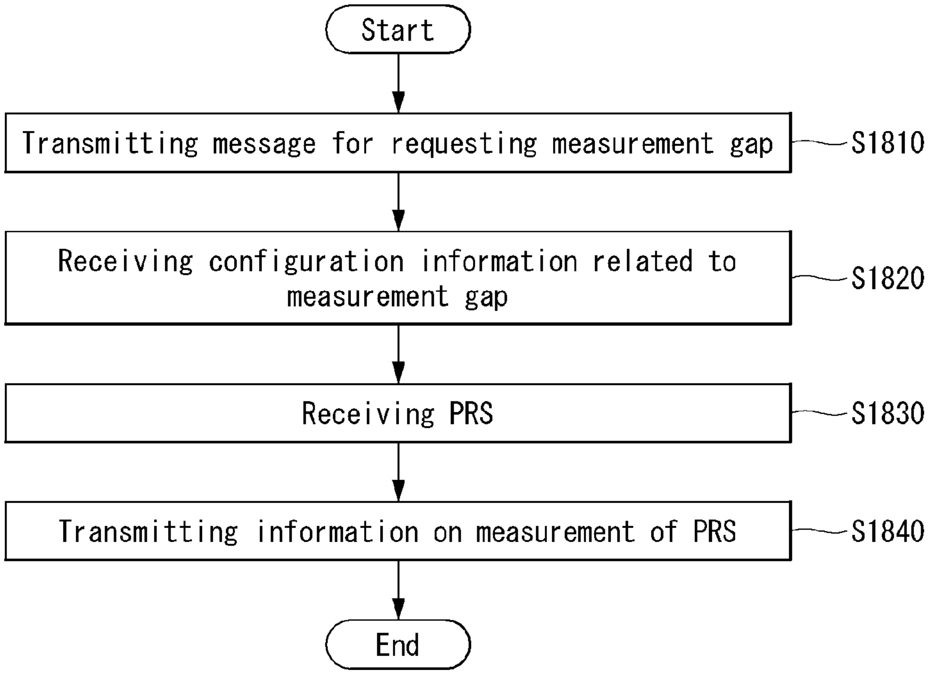

【FIG. 19】
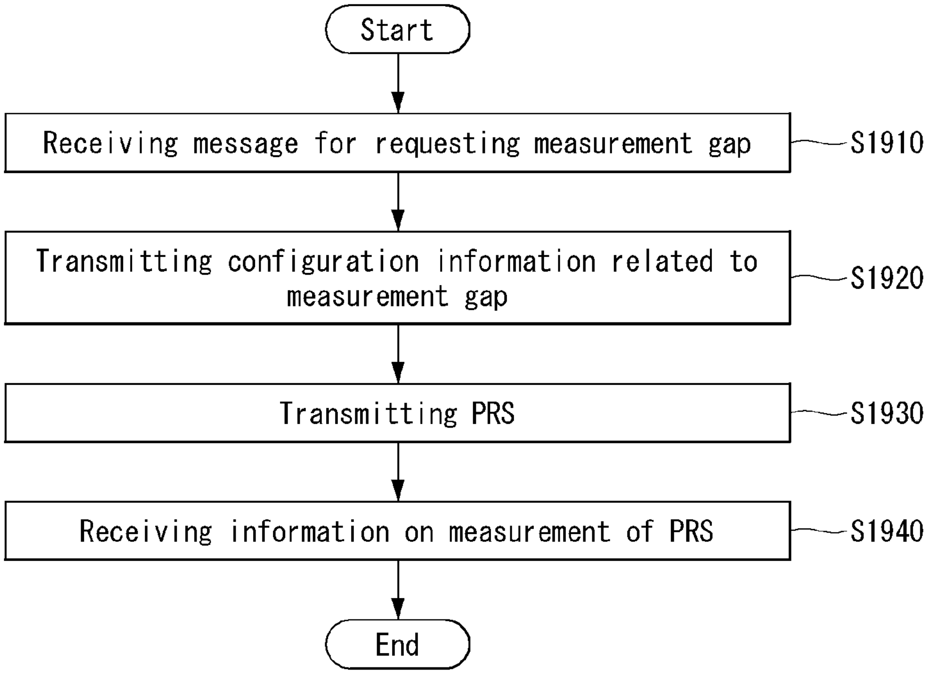
【FIG. 20】
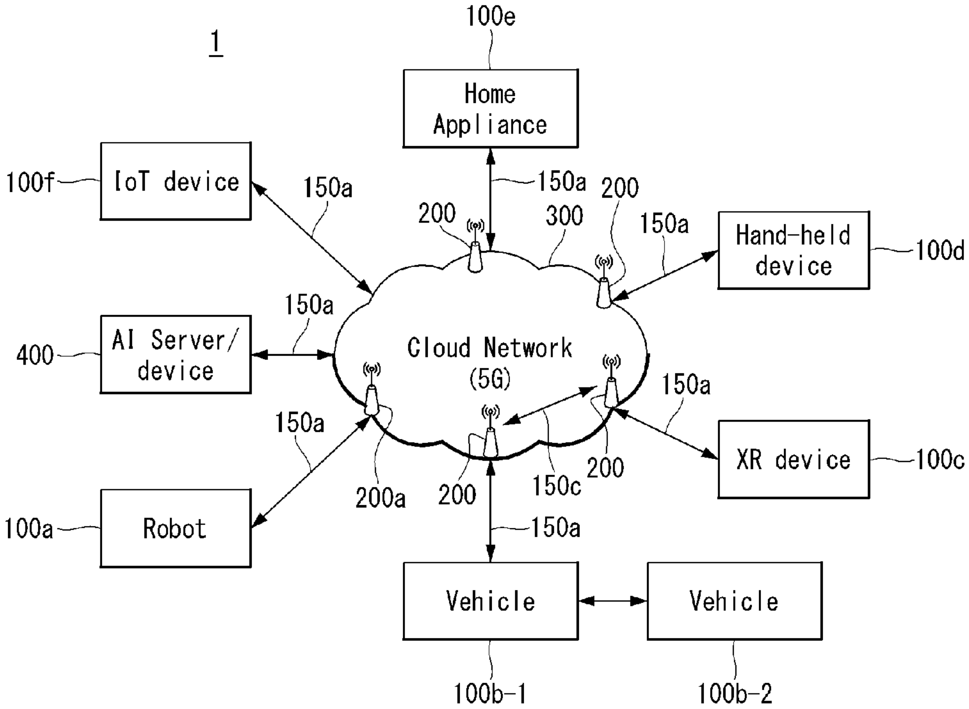

【FIG. 21】
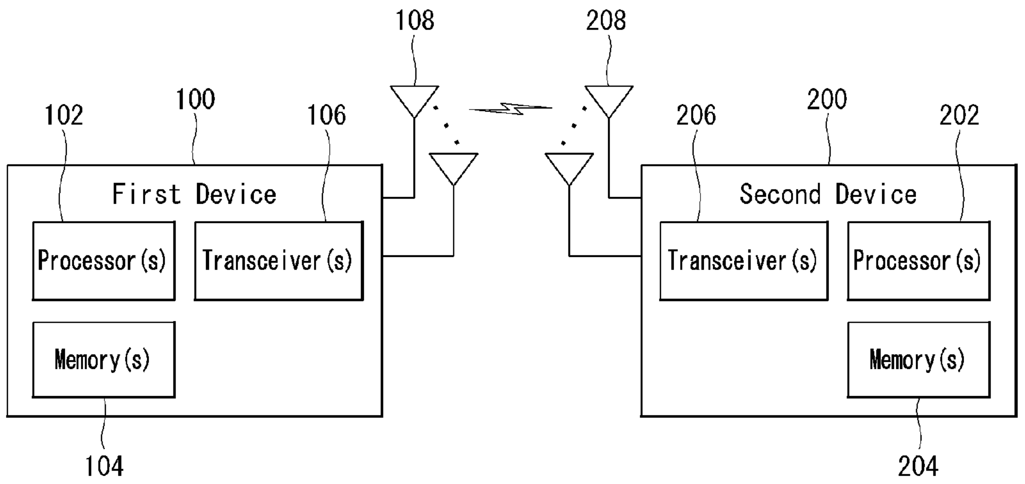

【FIG. 22】
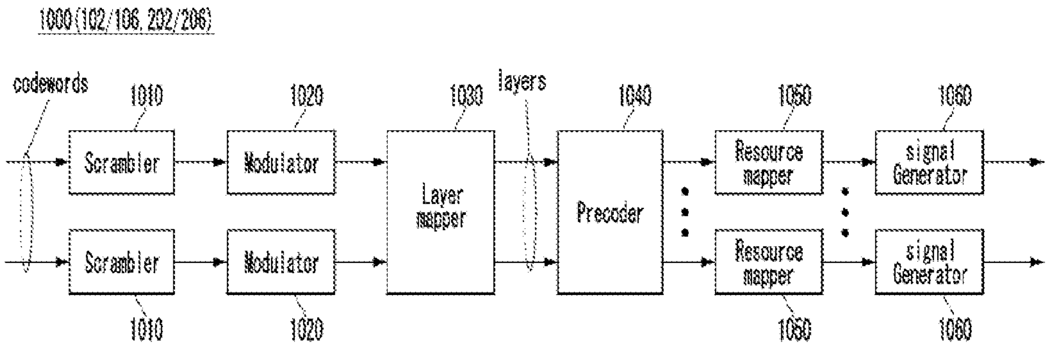
【FIG. 23】
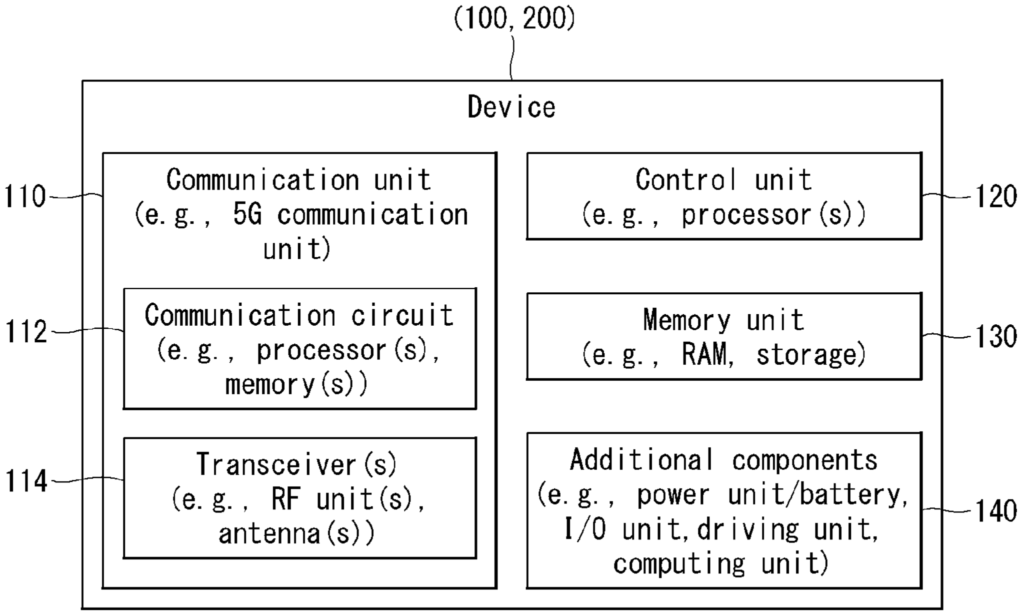

【FIG. 24】
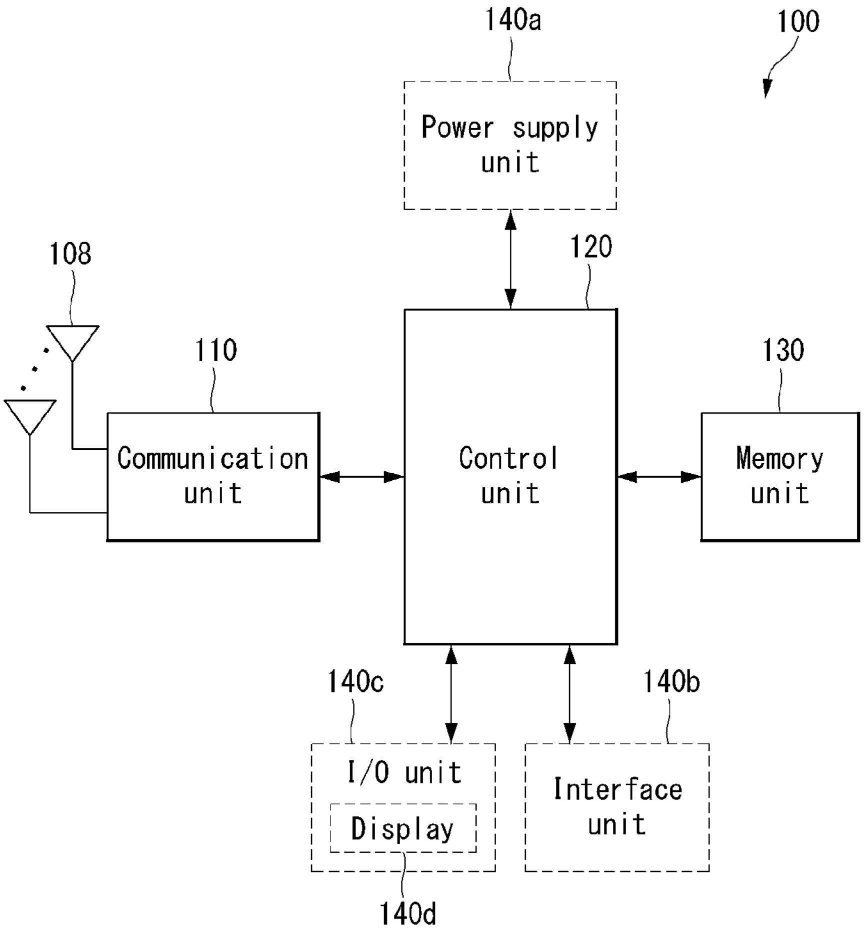

METHOD AND DEVICE FOR POSITIONING IN WIRELESS COMMUNICATION SYSTEM

CROSS-REFERENCE TO RELATED APPLICATIONS

This application is the National Stage filing under 35 U.S.C. 371 of International Application No. PCT/KR2022/006753, filed on May 11, 2022, which claims the benefit of earlier filing date and right of priority to Korean Application No. 10-2021-0060855, filed on May 11, 2021, the contents of which are all hereby incorporated by reference herein in their entireties.

TECHNICAL FIELD

The present disclosure relates to a method and device for positioning in a wireless communication system.

BACKGROUND

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

The user equipment (UE) receives a positioning reference signal (PRS) in a designated measurement gap section, and transmits a scheduling request regarding an uplink channel (UL channel) to the base station/server to report the corresponding measurement results. The base station/server transmits scheduling information about uplink resources to the UE through PDCCH, and the UE reports measurement results through designated uplink resources.

SUMMARY

From Rel. 17, latency requirements are shorter than before. Accordingly, signaling procedures related to reporting of the above-described measurement results may be difficult to meet the changed requirements.

The purpose of the present disclosure is to propose a method that can reduce latency in the physical layer with respect to reporting of measurement results.

Specifically, the purpose of the present disclosure is to propose a method that can reduce latency related to the operation of reporting information on measurement of a positioning reference signal (PRS).

Additionally, the purpose of the present disclosure is to propose a method that can reduce the latency in operation related to the measurement gap of the PRS.

The technical objects of the present disclosure are not limited to the aforementioned technical objects, and other technical objects, which are not mentioned above, will be apparently appreciated by a person having ordinary skill in the art from the following description.

A method for transmitting information on measurement of a positioning reference signal (PRS) by a user equipment (UE) in a wireless communication system according to an embodiment of the present disclosure, the method comprises transmitting a message for requesting a measurement gap, receiving configuration information related to the measurement gap, receiving the PRS based on the measurement gap, and transmitting information on measurement of the PRS.

The information on measurement of the PRS is transmitted based on a preconfigured resource.

The configuration information may include information related to the measurement of the PRS, and based on the information related to the measurement of the PRS, a number of PRS resources measured by the UE may be limited to a certain number.

The information related to the measurement of the PRS may include information on at least one of i) maximum or minimum number of the PRS resources, ii) minimum or maximum number of PRS resource sets and/or iii) maximum or minimum number of transmission and reception points (TRPs) related to the PRS.

The configuration information may include information representing a number of reports of the information on measurement of the PRS, and transmission of the information on the measurement of the PRS may be performed based on the number of reports.

Based on the number of reports being configured to 1 and the information on the measurement of the PRS being greater than information that can be transmitted through the preconfigured resource, one or more information elements among information elements representing the information on the measurement of the PRS may be determined, and the one or more information elements may be transmitted through the preconfigured resource.

The one or more information elements may be determined based on a predefined priority.

The preconfigured resource may be determined based on the configuration information.

The preconfigured resource may be based on a resource configured for grant-free transmission.

Buffer status report (BSR) information related to the preconfigured resource may be included in a scheduling request (SR) and transmitted, and the preconfigured resource may be determined based on an uplink grant (UL grant) related to the SR.

The preconfigured resource may be determined based on an uplink grant (UL grant) received at a predefined time point after the measurement gap, and the predefined time point may be determined based on the measurement gap and a preconfigured offset.

The preconfigured offset may be configured in units based on at least one of a symbol, a slot, or a subframe.

A value of the preconfigured offset may be configured based on a capability of the UE, and the capability of the UE may be related to time required for operations related to the measurement of the PRS.

The preconfigured resource may be based on a physical uplink control channel (PUCCH) resource for transmission of a scheduling request (SR).

A user equipment (UE) transmitting information on measurement of a positioning reference signal (PRS) in a wireless communication system according to another embodiment of the present disclosure, the UE comprises one or more transceivers, one or more processors controlling the one or more transceivers, and one or more memories operably connected to the one or more processors.

The one or more memories store instructions for performing operations based on being executed by the one or more processors.

The operations includes transmitting a message for requesting a measurement gap, receiving configuration information related to the measurement gap, receiving a positioning reference signal (PRS) based on the measurement gap, and transmitting information on measurement of the PRS.

The information on measurement of the PRS is transmitted based on a preconfigured resource.

A device for controlling a user equipment (UE) to transmit information on measurement of a positioning reference signal (PRS) in a wireless communication system according to another embodiment of the present disclosure, the device comprises one or more processors and one or more memories operably connected to the one or more processors.

The one or more memories store instructions for performing operations based on being executed by the one or more processors.

The operations include transmitting a message for requesting a measurement gap, receiving configuration information related to the measurement gap, receiving a positioning reference signal (PRS) based on the measurement gap, and transmitting information on measurement of the PRS.

The information on measurement of the PRS is transmitted based on a preconfigured resource.

One or more non-transitory computer-readable medium according to another embodiment of the present disclosure stores one or more instructions.

The one or more instructions perform operations based on being executed by one or more processors.

The operations include transmitting a message for requesting a measurement gap, receiving configuration information related to the measurement gap, receiving a positioning reference signal (PRS) based on the measurement gap, and transmitting information on measurement of the PRS.

The information on measurement of the PRS is transmitted based on a preconfigured resource.

A method for receiving information on measurement of a positioning reference signal (PRS) by a base station in a wireless communication system according to another embodiment of the present disclosure, the method comprises receiving a message for requesting a measurement gap, transmitting configuration information related to the measurement gap, transmitting a positioning reference signal (PRS) based on the measurement gap, and receiving information on measurement of the PRS.

The information on measurement of the PRS is received based on a preconfigured resource.

A base station receiving information on measurement of a positioning reference signal (PRS) in a wireless communication system according to another embodiment of the present disclosure, the base station comprises one or more transceivers, one or more processors controlling the one or more transceivers, and one or more memories operably connected to the one or more processors.

The one or more memories store instructions for performing operations based on being executed by the one or more processors.

The operations include receiving a message for requesting a measurement gap, transmitting configuration information related to the measurement gap, transmitting a positioning reference signal (PRS) based on the measurement gap, and receiving information on measurement of the PRS.

The information on measurement of the PRS is received based on a preconfigured resource.

According to an embodiment of the present disclosure, the information on the measurement of the PRS is transmitted through a preconfigured resource. As an example, the preconfigured resource may be a resource determined without a scheduling request. As an example, the preconfigured resource may be a resource determined without a buffer status report (BSR). As the signaling procedure in the physical layer can be simplified through the preconfigured resource as described above, the latency in reporting measurement results is reduced.

Additionally, according to an embodiment of the present disclosure, configuration information related to the PRS measurement gap may be configured to limit the number of PRS resources/TRPs referenced/measured for PRS measurement. Accordingly, the time required for the measurement operation is reduced.

Additionally, according to an embodiment of the present disclosure, the configuration information may include the number of reports related to information on the measurement of the PRS. Since the reporting operation of the measurement result is performed based on the number of reports, it is possible to prevent the latency from occurring as the operation related to resource allocation are repeated multiple times due to a lack of UL resources at the time of measurement reporting.

The effects that can be obtained from the present disclosure are not limited to the effects mentioned above, and other effects not mentioned will be clearly understood by those skilled in the art from the description below.

BRIEF DESCRIPTION OF THE DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 is a diagram illustrating an example of a positioning protocol configuration for measuring a location of a user equipment (UE).

FIG. 8 is a diagram illustrating an example of architecture of a system for measuring a location of an UE.

FIG. 9 is a diagram illustrating an example of a procedure for measuring a location of a UE.

FIG. 10 is a diagram illustrating an example of a protocol layer for supporting LPP message transmission.

FIG. 11 is a diagram illustrating an example of a protocol layer for supporting NRPPa transmission.

FIG. 12 is a diagram illustrating an example of an OTDOA positioning measurement method.

FIGS. 13A and 13B are diagrams illustrating an example of a Multi RTT positioning measurement method.

FIG. 14 illustrates a positioning measurement procedure from a physical layer perspective to which a method proposed in the present disclosure can be applied.

FIG. 15 illustrates a simplified positioning measurement procedure according to an embodiment of the present disclosure.

FIG. 16 is a diagram illustrating operations of a UE, TRP, and LMF to which a method proposed in the present disclosure can be applied.

FIG. 17 is a flowchart for explaining an operation of each UE, TRP and LMF to which a method proposed in the present disclosure can be applied.

FIG. 18 is a flowchart illustrating a method for a UE to transmit information on measurement of PRS in a wireless communication system according to an embodiment of the present disclosure.

FIG. 19 is a flowchart illustrating a method for a location server to receive information on measurement of PRS in a wireless communication system according to another embodiment of the present disclosure.

FIG. 20 illustrates a communication system 1 applied to the present disclosure.

FIG. 21 illustrates wireless devices applicable to the present disclosure.

FIG. 22 illustrates a signal process circuit for a transmission signal.

FIG. 23 illustrates another example of a wireless device applied to the present disclosure.

FIG. 24 illustrates a hand-held device applied to the present disclosure.

DETAILED DESCRIPTION

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE 36.211: Physical channels and modulation 36.212: Multiplexing and channel coding 36.213: Physical layer procedures 36.300: Overall description 36.331: Radio Resource Control (RRC)

3GPP NR 38.211: Physical channels and modulation 38.212: Multiplexing and channel coding 38.213: Physical layer procedures for control 38.214: Physical layer procedures for data 38.300: NR and NG-RAN Overall Description 36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies may be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s3=1/(\Delta f_{max} \cdot N_f)$, where $\Delta f_{max}=480 \cdot 10^3$, and $N_f=4096$. Downlink and uplink transmissions is constituted of a radio frame with a period of $T_f+=(\Delta f_{max} N_f/100) \cdot T_s=10$ ms. Here, the radio frame is constituted of 10 subframes each of which has a period of $T_{sf}=(\Delta f_{max} N_f/1000) \cdot T_s=1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $$N_{subframe}^{slot,\mu}$$

in the subframe and in ascending order of $$n_{s,f}^{\mu}$$

in the radio frame. One slot includes consecutive OFDM symbols of $$N_{symb}^{\mu},$$

is determined according to the used numerology and slot configuration. In the subframe, the start of slot $$n_s^{\mu}$$

is temporally aligned with the start of $$n_s^{\mu} N_{symb}^{\mu}.$$

Not all UEs are able to transmit and receive at the same time, and this means that not all OFDM symbols in a downlink slot or an uplink slot are available to be used.

Table 3 represents the number $$N_{symb}^{slot}$$

of OFDM symbols per slot, the number $$N_{slot}^{frame,\mu}$$

of slots per radio frame, and the number $$N_{slot}^{subframe,\mu}$$

of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |

TABLE 3-continued

| μ | $N_{symb}^{slot}$ | $N_{slot}^{frame,\mu}$ | $N_{slot}^{subframe,\mu}$ |
|---|---|---|---|
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $$N_{RB}^{\mu} N_{sc}^{RB}$$

subcarriers on a frequency domain, each subframe consisting of 14·2μ OFDM symbols, but the present disclosure is not limited thereto.

In the NR system, a transmitted signal is described by one or more resource grids, consisting of $$N_{PB}^{\mu} N_{sc}^{RB}$$

subcarriers, and $2^{\mu}$ $$N_{symb}^{(\mu)}$$

OFDM symbols, where $$N_{PB}^{\mu} \leq N_{RB}^{max,\mu}.$$

$$N_{RB}^{max,\mu}$$

denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄), where k=0, . . . , $$N_{RB}^{\mu} N_{sc}^{RB}$$

−1 is an index on a frequency domain, and l̄=0, . . . , $2^{\mu}$ $$N_{symb}^{(\mu)}$$

−1 refers to a location of a symbol in a subframe. The index pair (k,l̄) is used to refer to a resource element in a slot, where l=0, . . . , $$N_{symb}^{\mu}$$

−1.

The resource element (k,l̄) for the numerology μ and the antenna port p corresponds to a complex value $$a_{k,\bar{l}}^{(p,\mu)}.$$

When there is no risk for confusion or when a specific antenna port or numerology is not specified, the indexes p and μ may be dropped, and as a result, the complex value may be $$a_{k,\bar{l}}^{(p)}$$

Further, a physical resource block is defined as $$N_{sc}^{RB}$$

=12 consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequency PointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $$n_{CRB}^{\mu}$$

in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $$N_{BWP,i}^{size}$$

−1, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $$N_{BWP,i}^{start}$$

may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

Hereinafter, matters related to the definition of TRP mentioned in the present specification will be described in detail.

The base station described in this disclosure may be a generic term for an object that transmits/receives data to and from UE. For example, the base station described herein may be a concept including one or more transmission points (TPs), one or more transmission and reception points (TRPs), and the like. For example, multiple TPs and/or multiple TRPs described herein may be included in one base station or included in multiple base stations. In addition, the TP and/or TRP may include a panel of a base station, a transmission and reception unit, and the like.

In addition, the TRP described in this disclosure means an antenna array having one or more antenna elements available in a network located at a specific geographical location in a specific area. Although this disclosure is described with respect to "TRP" for convenience of explanation, the TRP may be replaced with a base station, a transmission point (TP), a cell (e.g., a macro cell/small cell/pico cell, etc.), an antenna array, or a panel and understood and applied as such.

Hereinafter, matters related to positioning in a wireless communication system will be described in detail.

Table 5 below shows definitions of terms used in relation to the positioning.

TABLE 5

| |
|---|
| Anchor carrier: In NB-IoT, a carrier where the UE assumes that NPSS/NSSS/NPBCH/SIB-NB are transmitted. |
| Location Server: a physical or logical entity (e.g., E-SMLC or SUPL SLP) that manages positioning for a target device by obtaining measurements and other location information from one or more positioning units and providing assistance data to positioning units to help determine this. A Location Server may also compute or verify the final location estimate. |
| E-SMLC: Evolved Serving Mobile Location Center |
| SLP: SUPL Location Platform |
| SUPL: Secure User Plane Location |
| NB-IoT: NB-IoT allows access to network services via E-UTRA with a channel bandwidth limited to 200 kHz. |
| Reference Source: a physical entity or part of a physical entity that provides signals (e.g., RF, acoustic, infra-red) that can be measured (e.g., by a Target Device) in order to obtain the location of a Target Device. |
| Target Device: the device that is being positioned (e.g., UE or SUPL SET). |
| Transmission Point (TP): A set of geographically co-located transmit antennas for one cell, part of one cell or one PRS-only TP. Transmission Points can include base station (ng-eNB or gNB) antennas, remote radio heads, a remote antenna of a base station, an antenna of a PRS-only TP, etc. One cell can be formed by one or multiple transmission points. For a homogeneous deployment, each transmission point may correspond to one cell. |

TABLE 5-continued

| |
|---|
| Observed Time Difference Of Arrival (OTDOA): The time interval that is observed by a target device between the reception of downlink signals from two different TPs. If a signal from TP 1 is received at the moment $t_1$, and a signal from TP 2 is received at the moment $t_2$, the OTDOA is $t_2 - t_1$. |
| PRS-only TP: A TP which only transmits PRS signals for PRS-based TBS positioning and is not associated with a cell. |
| expected RSTD (from 36.355): |
| 1) If PRS is transmitted: |
| This field indicates the RSTD value that the target device is expected to measure between this cell and the assistance data reference cell. The expectedRSTD field takes into account the expected propagation time difference as well as transmit time difference of PRS positioning occasions between the two cells. The RSTD value can be negative and is calculated as (expectedRSTD-8192). The resolution is $3 \times T_s$, with $T_s = 1/(15000*2048)$ seconds. |
| 2) If PRS is not transmitted: |
| This field indicates the RSTD value that the target device is expected to measure between this cell and the assistance data reference cell. The expectedRSTD field takes into account the expected propagation time difference as well as transmit time difference between the two cells. The RSTD value can be negative and is calculated as (expectedRSTD-8192). The resolution is $3 \times T_s$, with $T_s = 1/(15000*2048)$ seconds. |
| expectedRSTD-Uncertainty (from 36.355): |
| 1) If PRS is transmitted: |
| This field indicates the uncertainty in expectedRSTD value. The uncertainty is related to the location server's a-priori estimation of the target device location. The expectedRSTD and expectedRSTD-Uncertainty together define the search window for the target device. |
| The scale factor of the expectedRSTD-Uncertainty field is $3 \times T_s$, with $T_s = 1/(15000*2048)$ seconds. |
| The target device may assume that the beginning of the PRS occasion group of the PRS configuration with the longest PRS occasion group periodicity (NOTE) of the neighbour cell is received within the search window of size |
| [−expectedRSTD-Uncertainty × 3 × $T_s$, expectedRSTD-Uncertainty × 3 × $T_s$] centered at |
| $T_{REF}$ + 1 millisecond × N + (expectedRSTD□08192) × 3 × $T_s$, where $T_{REF}$ is the reception time of the beginning of |
| the first PRS occasion group of the first PRS configuration of the assistance data reference cell at the target device antenna connector, N = 0 when the EARFCN of the neighbour cell is equal to that of the assistance data reference cell, and N = prs-SubframeOffset otherwise. |
| 2) If PRS is not transmitted: |
| This field indicates the uncertainty in expectedRSTD value. The uncertainty is related to the location server's a-priori estimation of the target device location. The expectedRSTD and expectedRSTD-Uncertainty together define the search window for the target device. The scale factor of the expectedRSTD-Uncertainty field is $3 \times T_s$, with $T_s = 1/(15000*2048)$ seconds. |
| If $T_x$ is the reception time of the beginning of the subframe X of the assistance data reference cell at the target device antenna connector, the target device may assume that the beginning of the closest subframe of this neighbour cell to subframe X is received within the search window of size [−expectedRSTD-Uncertainty × 3 × $T_s$, expectedRSTD-Uncertainty × 3 × $T_s$] centered at $T_x$ + (expectedRSTD-8192) × 3 × $T_s$, |

The following shows definitions of abbreviations used in relation to the above positioning.

5GS: 5G System
AoA: Angle of Arrival
AP: Access Point
BDS: BeiDou Navigation Satellite System
BSSID: Basic Service Set Identifier
CID: Cell-ID (positioning method)
E-SMLC: Enhanced Serving Mobile Location Centre
E-CID: Enhanced Cell-ID (positioning method)
ECEF: Earth-Centered, Earth-Fixed
ECI: Earth-Centered-Inertial
EGNOS: European Geostationary Navigation Overlay Service
E-UTRAN: Evolved Universal Terrestrial Radio Access Network
GAGAN: GPS Aided Geo Augmented Navigation
GLONASS: GLObal'naya NAvigatsionnaya Sputnikovaya Sistema (Engl.: Global Navigation Satellite System)
GMLC: Gateway Mobile Location Center
GNSS: Global Navigation Satellite System
GPS: Global Positioning System
HESSID: Homogeneous Extended Service Set Identifier
LCS: LoCation Services
LMF: Location Management Function
LPP: LTE Positioning Protocol
MBS: Metropolitan Beacon System
MO-LR: Mobile Originated Location Request
MT-LR: Mobile Terminated Location Request
NG-C: NG Control plane
NG-AP: NG Application Protocol
NI-LR: Network Induced Location Request
NRPPa: NR Positioning Protocol A
OTDOA: Observed Time Difference Of Arrival
PDU: Protocol Data Unit
PRS: Positioning Reference Signal
QZSS: Quasi-Zenith Satellite System
RRM: Radio Resource Management
RSSI: Received Signal Strength Indicator
RSTD: Reference Signal Time Difference/Relative Signal Time Difference
SBAS: Space Based Augmentation System
SET: SUPL Enabled Terminal
SLP: SUPL Location Platform
SSID: Service Set Identifier
SUPL: Secure User Plane Location
TADV: Timing Advance
TBS: Terrestrial Beacon System
TOA: Time of Arrival
TP: Transmission Point (TRP: Transmission and Reception Point)
UE: User Equipment
WAAS: Wide Area Augmentation System
WGS-84: World Geodetic System 1984
WLAN: Wireless Local Area Network Positioning Positioning may mean determining the geographic location and/or speed of the UE by measuring a radio signal. The location information may be requested by a client (e.g. an application) related to the UE and reported to the client. In addition, the location information may be included in a core network or may be requested by a client connected to the core network. The location information may be reported in a standard format such as cell-based or geographic coordinates, and in this case, the estimation error values for the location(position) and speed of the UE and/or the positioning measurement method used for positioning may be reported together.

Positioning Protocol Configuration

FIG. 7 is a diagram illustrating an example of a positioning protocol configuration for measuring a location of a user equipment (UE).

Referring to FIG. 7, LPP may be used as a point-to-point between a location server (E-SMLC and/or SLP and/or LMF) and a target device to position the target device (UE and/or SET) based on position-related measurements obtained from one or more reference sources. The target device and the location server may exchange measurement and/or location information based on signal A and/or signal B through the LPP.

NRPPa may be used to exchange information between the reference source (ACCESS NODE and/or BS and/or TP and/or NG-RAN nodes) and the location server.

Functions provided by the NRPPa protocol may include the following.

E-CID Location Information Transfer: Through this function, location information may be exchanged between the reference source and the LMF for E-CID positioning purposes.

OTDOA Information Transfer: Through this function, information may be exchanged between the reference source and the LMF for OTDOA positioning purposes.

Reporting of General Error Situations: Through this function, a general error situation in which an error message for each function is not defined may be reported.

PRS Mapping

For positioning, a positioning reference signal (PRS) may be used. The PRS is a reference signal used for position estimation of the UE.

PRS mapping in a wireless communication system to which embodiments are applicable in the present disclosure may be performed based on Table 6 below.

TABLE 6

7.2 Physical resources

The following antenna ports are defined for the downlink:

Antenna ports starting with 5000 for positioning reference signals

The UE shall not assume that two antenna ports are quasi co-located with respect to any QCL type unless specified otherwise.

7.4.1.7 Positioning reference signals 7.4.1.7.1 General

A positioning frequency layer consists of one or more downlink PRS resource sets, each of which consists of one or more downlink PRS resources as described in [6, TS 38.214].

7.4.1.7.2 Sequence generation

The UE shall assume the reference-signal sequence r(m) is defined by $$r(m)=\frac{1}{\sqrt{2}}(1-2c(m))+j\frac{1}{\sqrt{2}}(1-2c(m+1))$$

where the pseudo-random sequence c(i) is defined in clause 5.2.1. The pseudo-random sequence generator shall be initialised with $$c_{init}=\left(2^{22}\left\lfloor\frac{n_{ID,seq}^{PRS}}{1024}\right\rfloor+2^{10}\left(N_{symb}^{slot}n_{s,f}^{\mu}+1+1\right)\left(2\left(n_{ID,seq}^{PRS}\bmod 1024\right)+1\right)+\left(n_{ID,seq}^{PRS}\bmod 1024\right)\right)\bmod 2^{31}$$

where $n_{s,f}^{\mu}$ is the slot number, the downlink PRS sequence ID $n_{ID,seq}^{PRS}\in\{0,1,\ldots,4095\}$ is given by the higher-layer parameter DL-PRS-SequenceId, and l is the OFDM symbol within the slot to which the sequence is mapped.

7.4.1.7.3 Mapping to physical resources in a downlink PRS resource

For each downlink PRS resource configured, the UE shall assume the sequence r(m) is scaled with a factor $\beta_{PRS}$ and mapped to resources elements $(k,l)_{p,\mu}$ according to $$a_{k,l}^{(p,\mu)}=\beta_{PRS}r(m)$$

$$m=0,1,\ldots$$

$$k=mK_{comb}^{PRS}+\left(\left(k_{offset}^{PRS}+k'\right)\bmod K_{comb}^{PRS}\right)$$

$$l=l_{start}^{PRS},l_{start}^{PRS}+1,\ldots,l_{start}^{PRS}+L_{PRS}-1$$

when the following conditions are fulfilled:

the resource element $(k,l)_{p,\mu}$ is within the resource blocks occupied by the downlink PRS resource for which the UE is configured;

the symbol l is not used by any SS/PBCH block used by the serving cell for downlink PRS transmitted from the serving cell or indicated by the higher-layer parameter SSB-positionInBurst for downlink PRS transmitted from a non-serving cell;

the slot number satisfies the conditions in clause 7.4.1.7.4. [TS 38.211]

and where

TABLE 6-continued $l_{start}^{PRS}$ is the first symbow of the downlink PRS within a slot and given by the higher-layer parameter DL-PRS-ResourceSymbolOffset;

the size of the downlink PRS resource in the time domain $L_{PRS} \in \{2,4,6,12\}$ is given by the higher-layer parameter DL-PRS-NumSymbols;

the comb size $K_{comb}^{PRS} \in \{2, 4, 6, 12\}$ is given by the higher-layer parameter transmissionComb;

the resource-element offset $k_{offset}^{PRS} \in \{0, 1, \ldots, K_{comb}^{PRS} - 1\}$ is given by the higher-layer parameter combOffset;

the quantity k' is given by Table 7.4.1.7.3-1.

The reference point for k = 0 is the location of the point A of the positioning frequency layer, in which the downlink PRS resource is configured where point A is given by the higher-layer parameter DL-PRS-PointA.

Table 7.4.1.7.3-1: The frequency offset $k'$ as a function of $l - l_{start}^{PRS}$

| | Symbol number within the downlink PRS resourse $l - l_{start}^{PRS}$ | | | | | | | | | | | |
|---|---|---|---|---|---|---|---|---|---|---|---|---|
| $K_{comb}^{PRS}$ | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

7.4.1.7.4 Mapping to slots in a downlink PRS resource set

For a downlink PRS resource in a downlink PRS resource set, the UE shall assume the downlink PRS resource being transmitted when the slot and frame numbers fulfil $$\left(N_{slot}^{frame,\mu} n_f + n_{s,f}^{\mu} - T_{offset}^{PRS} - T_{offset,res}^{PRS}\right) \bmod 2^{\mu} T_{per}^{PRS} \in \left\{iT_{gap}^{PRS}\right\}_{i=0}^{T_{rep}^{PRS}-1}$$

and one of the following conditions are fulfilled:

the higher-layer parameter DL-PRS-MutingPattern is not provided;

the higher-layer parameter DL-PRS-MutingPattern is provided and bitmap $\{b^1\}$ but not bitmap $\{b^2\}$ is provided, and bit $b_i^1$ is set;

the higher-layer parameter DL-PRS-MutingPattern is provided and bitmap $\{b^2\}$ but not bitmap $\{b^1\}$ is provided, and bit $b_i^2$ is set;

the higher-layer parameter DL-PRS-MutingPattern is provided and both bitmaps $\{b^1\}$ and $\{b^2\}$ are provided, and both bit $b_i^1$ and $b_i^2$ are set.

where $b_i^1$ is bit $i = \left\lfloor \left(N_{slot}^{frame,\mu} n_f + n_{s,f}^{\mu} - T_{offset}^{PRS} - T_{offset,res}^{PRS}\right) / \left(2^{\mu} T_{muting}^{PRS} T_{per}^{PRS}\right) \right\rfloor \bmod L$ in the bitmap given by the higher-layer parameter DL-PRS-MutingPattern where $L \in \{2, 4, 8, 16, 32\}$ is the size of the bitmap;

$b_i^2$ is bit $i = \left\lfloor \left(\left(N_{slot}^{frame,\mu} n_f + n_{s,f}^{\mu} - T_{offset}^{PRS} - T_{offset,res}^{PRS}\right) \bmod 2^{\mu} T_{per}^{PRS}\right) / T_{per}^{PRS} \right\rfloor \bmod T_{rep}^{PRS}$ $T_{rep}^{PRS}$ is the bitmap given by the higher-layer parameter DL-PRS-MutingPattern;

the slot offset $T_{offset}^{PRS} \in \{0, 1, \ldots, T_{per}^{PRS} - 1\}$ is given by the higher-layer parameter DL-PRS-ResourceSetSlotOffset;

the downlink PRS resourse slot offset $T_{offset,res}^{PRS}$ is given by the higher-layer TABLE 6-continued

| |
|---|
| parameter DL-PRS-ResourceSlotOffset;<br>the periodicity<br>$T_{per}^{PRS} \in \{4, 5, 8, 10, 16, 20, 32, 40, 64, 80, 160, 320, 640, 1280, 2560, 5120, 10240\}$<br>is given by the higher-layer parameter DL-PRS-Periodicity;<br>the repetition factor $T_{rep}^{PRS} \in \{1, 2, 4, 6, 8, 16, 32\}$ is given by the higher-layer parameter DL-PRS-ResourceRepetitionFactor;<br>the muting repetition factor $T_{muting}^{PRS}$ is given by the higher-layer parameter DL-PRS-MutingBitRepetitionFactor;<br>the time gap $T_{gap}^{PRS} \in \{1, 2, 4, 8, 16, 32\}$ is given by the higher-layer parameter DL-PRS-ResourceTimeGap;<br>For a downlink PRS resource in a downlink PRS resource set configured, the UE shall assume the downlink PRS resource being transmitted as described in clause 5.1.6.4 of [6, TS 38.214]. |

PRS Reception Procedure

The PRS reception procedure of the UE in a wireless communication system to which embodiments are applicable in the present disclosure may be performed based on Table 7 below.

TABLE 7

5.1.6.5 PRS reception procedure

The UE can be configured with one or more DL PRS resource set configuration(s) as indicated by the higher layer parameters DL-PRS-ResourceSet and DL-PRS-Resource. Each DL PRS resource set consists of K ≥ 1 DL PRS resource(s) where each has an associated spatial transmission filter. The UE can be configured with one or more DL PRS Positioning Frequency Layer configuration(s) as indicated by the higher layer parameter DL-PRS-PositioningFrequencyLayer. A DL PRS Positioning Frequency Layer is defined as a collection of DL PRS Resource Sets which have common parameters configured by DL-PRS-PositioningFrequencyLayer.

The UE assumes that the following parameters for each DL PRS resource(s) are configured via higher layer parameters DL-PRS-PositioningFrequencyLayer, DL-PRS-ResourceSet and DL-PRS-Resource.

A positioning frequency layer consists of one or more PRS resource sets and it is defined by:

DL-PRS-SubcarrierSpacing defines the subcarrier spacing for the DL PRS resource. All DL PRS Resources and DL PRS Resource sets in the same DL-PRS-PositioningFrequencyLayer have the same value of DL-PRS-SubcarrierSpacing. The supported values of DL-PRS-SubcarrierSpacing are given in Table 4.2-1 of [4, TS38.211].

DL-PRS-CyclicPrefix defines the cyclic prefix for the DL PRS resource. All DL PRS Resources and DL PRS Resource sets in the same DL-PRS-PositioningFrequencyLayer have the same value of DL-PRS-CyclicPrefix. The supported values of DL-PRS-CyclicPrefix are given in Table 4.2-1 of [4, TS38.211].

DL-PRS-PointA defines the absolute frequency of the reference resource block. Its lowest subcarrier is also known as Point A. All DL PRS resources belonging to the same DL PRS Resource Set have common Point A and all DL PRS Resources sets belonging to the same DL-PRS-PositioningFrequency Layer have a common Point A.

The UE expects that it will be configured with [IDs] each of which is defined such that it is associated with multiple DL PRS Resource Sets from the same cell. The UE expects that one of these [IDs] along with a DL-PRS-ResourceSetId and a DL-PRS-ResourceId can be used to uniquely identify a DL PRS Resource.

A PRS resource set consists of one or more PRS resources and it is defined by:

DL-PRS-ResourceSetId defines the identity of the DL PRS resource set configuration.

TABLE 7-continued

DL-PRS-Periodicity defines the DL PRS resource periodicity and takes values $T_{per}^{PRS} \in 2^{\mu}\{4, 8, 16, 32, 64, 5, 10, 20, 40, 80, 160, 320, 640, 1280, 2560, 5120, 10240, 20480\}$ slots, where μ = 0, 1, 2, 3 for DL-PRS-SubcarrierSpacing = 15, 30, 60 and 120 kHz respectively. $T_{per}^{PRS} = 2^{\mu} \cdot 20480$ is not supported for $\mu = 0$.

All the DL PRS resources within one resource set are configured with the same periodicity.

DL-PRS-ResourceRepetitionFactor defines how many times each DL-PRS resource is repeated for a single instance of the DL-PRS resource set and takes values $T_{rep}^{PRS} \in \{1, 2, 4, 6, 8, 16, 32\}$. All the DL PRS resources within one resource set have the same ResourceRepetitionFactor DL-PRS-ResourceTimeGap defines the offset in number of slots between two repeated instances of a DL PRS resource with the same DL-PRS-ResourceID within a single instance of the DL PRS resource set and takes values $T_{gap}^{PRS} \in \{1, 2, 4, 8, 16, 32\}$. The UE only expects to be configured with DL-PRS-ResourceTimeGap if DL-PRS-ResourceRepetitionFactor is configured with value greater than 1. The time duration spanned by one instance of a DL-PRS-ResourceSet is not expected to exceed the configured value of DL-PRS-Periodicity. All the DL PRS resources within one resource set have the same DL-PRS-ResourceTimeGap.

DL-PRS-MutingPattern defines a bitmap of the time locations where the DL PRS resource is expected to not be transmitted for a DL PRS resource set. The bitmap size can be {2, 4, 8, 16, 32} bits long. The bitmap has two options for applicability. In the first option each bit in the bitmap corresponds to a configurable number of consecutive instances of a DL-PRS-ResourceSet where all the DL-PRS-Resources within the set are muted for the instance that is indicated to be muted. In the second option each bit in the bitmap corresponds to a single repetition index for each of the DL-PRS-Resources within each instance of a DL-PRS-ResourceSet and the length of the bitmap is equal to DL-PRS-ResourceRepetitionFactor. Both options may be configured at the same time in which case the logical AND operation is applied to the bit maps as described in clause 7.4.1.7.4 of [4, TS 38.211].

DL-PRS-SFN0-Offset defines the time offset of the SFNO slot 0 for the transmitting cell with respect to SFNO slot 0 of [FFS in RAN2].

TABLE 7-continued

DL-PRS-ResourceSetSlotOffset defines the slot offset with respect to SFN0 slot 0 and takes values $T_{offset}^{PRS} \in \{0, 1, \ldots, T_{per}^{PRS} - 1\}$.

DL-PRS-CombSizeN defines the comb size of a DL PRS resource where the allowable values are given in Clause 7.4.1.7.1 of [TS38.211]. All DL PRS resource sets belonging to the same positioning frequency layer have the same value of DL-PRS-combSizeN.

DL-PRS-ResourceBandwidth defines the number of resource blocks configured for PRS transmission. The parameter has a granularity of 4 PRBs with a minimum of 24 PRBs and a maximum of 272 PRBs. All DL PRS resources sets within a positioning frequency layer have the same value of DL-PRS-ResourceBandwidth.

A PRS resource is defined by:

DL-PRS-ResourceList determines the DL PRS resources that are contained within one DL PRS resource set.

DL-PRS-ResourceId determines the DL PRS resource configuration identity. All DL PRS resource IDs are locally defined within a DL PRS resource set.

DL-PRS-SequenceId is used to initialize cinit value used in pseudo random generator [4, TS38.211, 7.4.1.7.2] for generation of DL PRS sequence for a given DL PRS resource.

DL-PRS-ReOffset defines the starting RE offset of the first symbol within a DL PRS resource in frequency. The relative RE offsets of the remaining symbols within a DL PRS resource are defined based on the initial offset and the rule described in Clause 7.4.1.7.3 of [4, TS38.211].

DL-PRS-ResourceSlotOffset determines the starting slot of the DL PRS resource with respect to corresponding DL-PRS-ResourceSetSlotOffset DL-PRS-ResourceSymbolOffset determines the starting symbol of the DL PRS resource within the starting slot.

DL-PRS-NumSymbols defines the number of symbols of the DL PRS resource within a slot where the allowable values are given in Clause 7.4.1.7.1 of [4, TS38.211].

DL-PRS-QCL-Info defines any quasi-colocation information of the DL PRS resource with other reference signals. The DL PRS may be configured to be 'QCL-Type-D' with a DL PRS or SS/PBCH Block from a serving cell or a non-serving cell. The DL PRS may be configured to be 'QCL-Type-C' with a SS/PBCH Block from a serving or non-serving cell. If the DL PRS is configured as both 'QCL-Type-C' and 'QCL-Type-D' with a SS/PBCH Block then the SSB index indicated should be the same.

DL-PRS-StartPRB defines the starting PRB index of the DL PRS resource with respect to reference Point A. The starting PRB index has a granularity of one PRB with a minimum value of 0 and a maximum value of 2176 PRBs. All DL PRS Resource Sets belonging to the same Positioning Frequency Layer have the same value of Start PRB. The UE assumes constant EPRE is used for all REs of a given DL PRS resource. The UE may be indicated by the network that a DL PRS resources can be used as the reference for the RSTD measurement in a higher layer parameter DL-PRS-RstdReferenceInfo. The reference time indicated by the network to the UE can also be used by the UE to determine how to apply higher layer parameters DL-PRS-expectedRSTD and DL-PRS-expectedRSTD-uncertainty. The UE expects the reference time to be indicated whenever it is expected to receive the DL PRS. This reference time provided by DL-PRS-RstdReferenceInfo may include an [ID], a PRS resource set ID, and optionally a single PRS resource ID or a list of PRS resource IDs. The UE may use different DL PRS resources or a different DL PRS resource set to determine the reference time for the RSTD measurement as long as the condition that the DL PRS resources used belong to a single DL PRS resource set is met. If the UE chooses to use a different reference time than indicated by the network, then it is expected to report the DL PRS resource ID(s) or the DL PRS resource set ID used to determine the reference.

The UE may be configured to report quality metrics corresponding to the RSTD and UE Rx-Tx time difference measurements which include the following fields:

TimingMeasQuality-Value which provides the best estimate of the uncertainty of the measurement TimingMeasQuality-Resolution which specifies the resolution levels used in the Value field The UE expects to be configured with higher layer parameter DL-PRS-expectedRSTD, which defines the time difference with respect to the received DL subframe timing the UE is expected to receive DL PRS, and DL-PRS-expectedRSTD-uncertainty, which defines a search window around the expectedRSTD.

TABLE 7-continued

For DL UE positioning measurement reporting in higher layer parameters DL-PRS-RstdMeasurementInfo or DL-PRS-UE-Rx-Tx-MeasurementInfo the UE can be configured to report the DL PRS resource ID(s) or the DL PRS resource set ID(s) associated with the DL PRS resource(s) or the DL PRS resource set(s) which are used in determining the UE measurements DL RSTD, UE Tx-Rx time difference or the DL PRS-RSRP.

The UE can be configured in higher layer parameter UE Rx-Tx Time-MeasRequestInfo to report multiple UE Rx-Tx time difference measurements corresponding to a single configured SRS resource or resource set for positioning. Each measurement corresponds to a single received DL PRS resource or resource set which can be in difference positioning frequency layers.

For the DL RSTD, DL PRS-RSRP, and UE Rx-Tx time difference measurements the UE can report an associated higher layer parameter Timestamp. The Timestamp can include the SFN and the slot number for a subcarrier spacing. These values correspond to the reference which is provided by DL-PRS-RSTDReferenceInfo.

The UE is expected to measure the DL PRS resource outside the active DL BWP or with a numerology different from the numerology of the active DL BWP if the measurement is made during a configured measurement gap. When not configured with a measurement gap, the UE is only required to measure DL PRS within the active DL BWP and with the same numerology as the active DL BWP. If the UE is not provided with a measurement gap, the UE is not expected to process DL PRS resources on serving or non-serving cells on any symbols indicated as UL by the serving cell. When the UE is expected to measure the DL PRS resource outside the active DL BWP it may request a measurement gap in higher layer parameter [XYZ].

The UE assumes that for the serving cell the DL PRS is not mapped to any symbol that contains SS/PBCH. If the time frequency location of the SS/PBCH block transmissions from non-serving cells are provided to the UE then the UE also assumes that the DL PRS is not mapped to any symbol that contains the SS/PBCH block of the non-serving cell.

The UE may be configured to report, subject to UE capability, up to 4 DL RSTD measurements per pair of cells with each measurement between a different pair of DL PRS resources or DL PRS resource sets within the DL PRS configured for those cells. The up to 4 measurements being performed on the same pair of cells and all DL RSTD measurements in the same report use a single reference timing.

The UE may be configured to measure and report up to 8 DL PRS RSRP measurements on different DL PRS resources from the same cell. When the UE reports DL PRS RSRP measurements from one DL PRS resource set, the UE may indicate which DL PRS RSRP measurements have been performed using the same spatial domain filter for reception.

If the UE is configured with DL-PRS-QCL-Info and the QCL relation is between two DL PRS resources, then the UE assumes those DL PRS resources are from the same cell. If DL-PRS-QCL-Info is configured to the UE with 'QCL-Type-D' with a source DL-PRS-Resource then the DL-PRS-ResourceSetId and the DL-PRS-ResourceId of the source DL-PRS-Resource are expected to be indicated to the UE. The UE does not expect to process the DL PRS in the same symbol where other DL signals and channels are transmitted to the UE when there is no measurement gap configured to the UE.

Positioning Architecture

FIG. 8 is a diagram illustrating an example of architecture of a system for measuring a location of an UE.

Referring to FIG. 8, the AMF (Core Access and Mobility Management Function) may receive a request for location service related to a specific target UE from another entity such as the GMLC (Gateway Mobile Location Center), or may decide to start the location service on behalf of the specific target UE in the AMF itself. Then, the AMF transmits a location service request to the LMF (Location Management Function). The LMF receiving the location service request may process the location service request and return a processing result including the estimated location of the UE to the AMF. On the other hand, based on the location service request being received from another entity such as the GMLC other than the AMF, the AMF may transmit the processing result received from the LMF to another entity.

New generation evolved-NB (ng-eNB) and gNB may be network elements of NG-RAN that can provide measurement results for location tracking, and measure a radio signal for the target UE and transmit the result to the LMF. In addition, the ng-eNB may control some TPs (Transmission Points), such as remote radio heads, or PRS-only TPs supporting a PRS-based beacon system for E-UTRA.

The LMF may be connected to an Enhanced Serving Mobile Location Center (E-SMLC), and the E-SMLC may enable the LMF to access the E-UTRAN. For example, the E-SMLC may enable the LMF to support Observed Time Difference Of Arrival (OTDOA) which is one of the E-UTRAN positioning measurement methods, based on the downlink measurement which is obtained by the target UE through a signal transmitted from TPs dedicated for PRS in the eNB and/or E-UTRAN.

Meanwhile, the LMF may be connected to a SUPL Location Platform (SLP). The LMF may support and manage different location services for target UEs. The LMF may interact with the serving ng-eNB or serving gNB for the target UE to obtain the location measurement of the UE. For positioning of the target UE, the LMF may determine a positioning measurement method based on Location Service (LCS) client type, required QoS (Quality of Service), UE positioning capabilities, and gNB positioning capabilities and ng-eNB positioning capabilities, and apply this positioning measurement method to the serving gNB and/or the serving ng-eNB. Then, the LMF may determine a position estimate for the target UE and additional information such as accuracy of the position estimate and velocity. The SLP is a SUPL (Secure User Plane Location) entity responsible for positioning through a user plane.

The UE may measure the location of the UE by utilizing a downlink reference signal transmitted from the NG-RAN and the E-UTRAN. In this case, the downlink reference signal transmitted from the NG-RAN and the E-UTRAN to the UE may include an SS/PBCH block, CSI-RS and/or PRS, etc., and whether to measure the location of the UE using any downlink reference signal may depend on a configuration such as LMF/E-SMLC/ng-eNB/E-UTRAN, etc. In addition, the location of the UE may be measured in a RAT-independent method using different GNSS (Global Navigation Satellite System), TBS (Terrestrial Beacon System), WLAN access points, Bluetooth beacon and a sensor (e.g. barometric pressure sensor) built into the UE. The UE may include an LCS application, and access the LCS application through communication with a network to which the UE is connected or other applications included in the UE. The LCS application may include measurement and calculation functions necessary to determine the location of the UE. For example, the UE may include an independent positioning function such as Global Positioning System (GPS), and may report the location of the UE independently of NG-RAN transmission. The independently acquired positioning information may be utilized as auxiliary information of positioning information acquired from the network.

Position Measurement Procedure

FIG. 9 is a diagram illustrating an example of a procedure for measuring a location of a UE.

When the UE is in CM-IDLE (Connection Management-IDLE) state, when the AMF receives a location service request, the AMF may establish a signaling connection with the UE, and request a network trigger service to allocate a specific serving gNB or ng-eNB. This operation process is omitted in FIG. 9. That is, in FIG. 8, it may be assumed that the UE is in a connected mode. However, the signaling connection may be released during the positioning process by the NG-RAN for reasons such as signaling and data inactivity.

Looking at the operation process of the network for measuring the location of the UE in detail with reference to FIGS. 8 and 9, in step 1*a*, a 5GC entity such as GMLC may request a location service for measuring the location of a target UE with a serving AMF. However, even if the GMLC does not request the location service, based on step 1*b*, the serving AMF may determine that the location service is necessary for measuring the location of the target UE. For example, in order to measure the location of the UE for an emergency call, the serving AMF may decide to directly perform the location service.

Then, based on step 2, the AMF may send a location service request to the LMF, and based on step 3*a*, the LMF may initiate location procedures for obtaining location measurement data or location measurement assistance data together with the serving ng-eNB and the serving gNB. For example, the LMF may request location-related information related to one or more UEs to the NG-RAN, and instruct the type of location information required and the associated QoS. Then, in response to the request, the NG-RAN may transmit the location-related information to the LMF. In this case, based on the method for determining the location by the request being E-CID, the NG-RAN may transmit additional location-related information to the LMF through one or more NRPPa messages. Here, 'location-related information' may mean all values used for location calculation, such as actual location estimation information and wireless measurement or location measurement, etc. In addition, the protocol used in step 3*a* may be an NRPPa protocol, which will be described later.

Additionally, based on step 3*b*, the LMF may initiate location procedures for downlink positioning with the UE. For example, the LMF may send location assistance data to the UE, or obtain a location estimate or location measurement. For example, in step 3*b*, a capability transfer process may be performed. Specifically, the LMF may request capability information from the UE, and the UE may transmit capability information to the LMF. In this case, the capability information may include information on a location measurement method that the LFM or UE can support, information on various aspects of a specific location measurement method, such as various types of assistance data for A-GNSS, and information on common characteristics that are not limited to any one location measurement method, such as the ability to handle multiple LPP transactions, etc. Meanwhile, in some cases, even if the LMF does not request capability information from the UE, the UE may provide capability information to the LMF.

As another example, a location assistance data transfer process may be performed in step 3*b*. Specifically, the UE may request location assistance data from the LMF, and may indicate required specific location assistance data to the LMF. Then, the LMF may deliver location assistance data corresponding thereto to the UE, and additionally, may transmit additional assistance data to the UE through one or more additional LPP messages. On the other hand, location assistance data transmitted from the LMF to the UE may be transmitted through a unicast method, and in some cases, the LMF may transmit location assistance data and/or additional assistance data to the UE without the UE requesting assistance data from the LMF.

As another example, a location information transfer process may be performed in step 3*b*. Specifically, the LMF may request the UE for location-related information related to the UE, and may indicate the type of location information required and the associated QoS. Then, in response to the request, the UE may transmit the location related information to the LMF. In this case, the UE may additionally transmit additional location-related information to the LMF through one or more LPP messages. Here, 'location-related information' may mean all values used for location calculation, such as actual location estimation information and wireless measurement or location measurement, etc, and representatively, there may be a Reference Signal Time Difference (RSTD) value measured by the UE based on downlink reference signals transmitted from a plurality of NG-RAN and/or E-UTRAN to the UE. Similar to the above, the UE may transmit the location-related information to the LMF even if there is no request from the LMF.

On the other hand, the processes made in step 3*b* described above may be performed independently, but may be performed continuously. In general, step 3*b* is performed in the order of a capability transfer process, an assistance data transfer process, and a location information transfer process, but is not limited to this order. In other words, step 3*b* is not limited to a specific order in order to improve the flexibility of location measurement. For example, the UE may request location assistance data at any time to perform the location measurement request already requested by the LMF. In addition, if the location information delivered by the UE does not satisfy the QoS required, the LMF may also request location information, such as location measurements or location estimates, at any time. Similarly, when the UE does not perform measurement for location estimation, the UE may transmit capability information to the LMF at any time.

In addition, when an Error occurs in the information or request exchanged between the LMF and the UE in step 3*b*, an Error message may be transmitted/received, and an Abort message may be transmitted/received for stopping position measurement.

On the other hand, the protocol used in step 3*b* may be an LPP protocol, which will be described later.

Meanwhile, step 3*b* may be additionally performed after step 3*a* is performed, or may be performed instead of step 3*a*.

In step 4, the LMF may provide a location service response to the AMF. In addition, the location service response may include information on whether the location estimation of the UE was successful and the location estimate of the UE. After that, if the procedure of FIG. 9 is initiated by step 1*a*, the AMF may deliver a location service response to a 5GC entity such as GMLC, and if the procedure of FIG. 9 is initiated by step 1*b*, the AMF may use a location service response to provide a location service related to an emergency call or the like.

In the protocol for location measurement described below, definitions of some terms may be based on Table 8 below.

TABLE 8

| |
|---|
| NR-Uu interface: The NR-Uu interface, connecting the UE to the gNB over the air, is used as one of several transport links for the LTE Positioning Protocol for a target UE with NR access to NG-RAN. |
| LTE-Uu interface: The LTE-Uu interface, connecting the UE to the ng-eNB over the air, is used as one of several transport links for the LTE Positioning Protocol for a target UE with LTE access to NG-RAN. |
| NG-C interface: The NG-C interface between the gNB and the AMF and between the ng-eNB and the AMF is transparent to all UE-positioning-related procedures. It is involved in these procedures only as a transport link for the LTE Positioning Protocol. For gNB related positioning procedures, the NG-C interface transparently transports both positioning requests from the LMF to the gNB and positioning results from the gNB to the LMF. For ng-eNB related positioning procedures, the NG-C interface transparently transports both positioning requests from the LMF to the ng-eNB and positioning results from the ng-eNB to the LMF. |
| NLs interface: The NLs interface, between the LMF and the AMF, is transparent to all UE related, gNB related and ng-eNB related positioning procedures. It is used only as a transport link for the LTE Positioning Protocols LPP and NRPPa. |

LTE Positioning Protocol (LPP)

FIG. 10 is a diagram illustrating an example of a protocol layer for supporting LPP message transmission.

Referring to FIG. 10, an LPP PDU may be transmitted through a NAS PDU between the MAF and the UE. The LPP may terminate a connection between a target device (e.g. UE in the control plane or SUPL Enabled Terminal (SET) in the user plane) and a location server (e.g. LMF in the control plane or SLP in the user plane). The LPP message may be delivered in the form of a transparent PDU through an intermediate network interface using an appropriate protocol such as NGAP through the NG-C interface, NAS/RRC through the LTE-Uu and NR-Uu interfaces. The LPP protocol enables positioning for NR and LTE based on various positioning methods.

For example, the target device and the location server may exchange capability information, assistance data for positioning, and/or location information with each other through the LPP protocol. In addition, error information exchange and/or an instruction to stop the LPP procedure may be performed through the LPP message.

LPP Procedures for UE Positioning

A signal transmission/reception operation based on the LPP protocol to which the method proposed in the present disclosure can be applied may be performed based on Table 9 below.

TABLE 9

| |
|---|
| As described above, the protocol operates between a "target" and a "server". In the control-plane the SET and the context, these entities are the UE and LMF respectively; in the SUPL context they are SLP. A procedure may be initiated by either the target or the server. |
| 1) Capability Transfer |
| Capabilities in an LPP context refer to the ability of a target or server to support different position methods defined for LPP, different aspects of a particular position method (e.g. different types of assistance data for A-GNSS) and common features not specific to only one position method (e.g. ability to handle multiple LPP transactions). These capabilities are defined within the LPP protocol and transferred between the target and the server using LPP transport. |
| The exchange of capabilities between a target and a server may be initiated by a request or sent as "unsolicited" information. If a request is used, the server sends an LPP Request Capabilities message to the target device with a request for capability information. The target sends an LPP Provide Capabilities message. |
| Example of LPP Capability Transfer procedure |
| 1. The server may send a request for the LPP related capabilities of the target. |
| 2. The target transfers its LPP-related capabilities to the server. The capabilities may refer to particular position methods or may be common to multiple position methods. |
| LPP Capability Indication procedure is used for unsolicited capability transfer. |
| 2) Assistance data Transfer |
| Assistance data may be transferred either by request or unsolicited. In this version of the specification, assistance data delivery is supported only via unicast transport from server to target. |
| Example of LPP Assistance Data Transfer procedure |
| 1. The target may send a request to the server for assistance data and may indicate the particular assistance data needed. |
| 2. The server transfers assistance data to the target. The transferred assistance data should match any assistance data requested in step 1. |
| 3. Optionally, the server may transfer additional assistance data to the target in one or more additional LPP messages. |
| LPP Assistance Data Delivery procedure is used for unilateral assistance data transfer. This procedure is unidirectional; assistance data are always delivered from the server to the target. |
| 3) Location Information Transfer |
| The term "location information" applies both to an actual position estimate and to values used in computing position (e.g., radio measurements or positioning measurements). It is delivered either in response to a request or unsolicited. |
| Example of LPP Location Information Transfer procedure |
| 1. The server may send a request for location information to the target, and may indicate the type of location information needed and associated QoS. |
| 2. In response to step 1, the target transfers location information to the server. The location information transferred should match the location information requested in step 1. |
| 3. Optionally (e.g., if requested in step 1), the target in step 2 may transfer additional location information to the server in one or more additional LPP messages. |
| LPP Location Information Delivery procedure is used for unilateral location information transfer. Furthermore, the LPP Location Information Delivery procedure can only be piggybacked in the MO-LR request. |
| 4) Multiple Transactions |
| Multiple LPP transactions may be in progress simultaneously between the same target and server nodes, to improve flexibility and efficiency. However, no more than one LPP procedure between a particular pair of target and server nodes to obtain location information shall be in progress at any time for the same position method. |
| In this example, the objective is to request location measurements from the target, and the server does not provide assistance data in advance, leaving the target to request any needed assistance data. |
| Example of multiple LPP procedures |
| 1. The server sends a request to the target for positioning measurements. |
| 2. The target sends a request for particular assistance data. |
| 3. The server returns the assistance data requested in step 2. |
| 4. The target obtains and returns the location information (e.g., positioning method measurements) requested in step 1. |
| 5) Error handling |
| The procedure is used to notify the sending endpoint by the receiving endpoint that the receiving LPP message is erroneous or unexpected. This procedure is bidirectional at the LPP level; either the target or the server may take the role of either endpoint in the corresponding procedure. |
| Example of Error handling procedure |
| 1. The target or server sends a LPP message to the other endpoint (i.e, "Server/Target"). |
| 2. If the server or target ("Server/Target") detects that the receiving LPP message is erroneous or unexpected, the server or target transfers error indication information to the other endpoint ("Target/Server"). |
| 6) Abort |
| The procedure is used to notify the other endpoint by one endpoint to abort an ongoing procedure between the two endpoints. This procedure is bidirectional at the LPP level; either the target or the server may take the role of either endpoint in the corresponding procedure. |
| Example of Abort procedure |
| 1. A LPP procedure is ongoing between target and server. |
| 2. If the server or target ("Server/Target") determines that the procedure must be aborted, and then the server or target sends an LPP Abort message to the other endpoint ("Target/Server") carrying the transaction ID for the procedure. |

NR Positioning Protocol A (NRPPa)

FIG. 11 is a diagram illustrating an example of a protocol layer for supporting NRPPa transmission. Specifically, FIG. 11 illustrates a protocol layer for supporting transmission of an NRPPa PDU (NR Positioning Protocol a Protocol Data Unit).

The NRPPa may be used for information exchange between the NG-RAN node and the LMF. Specifically, the NRPPa may used to exchange E-CID for measurement transmitted from ng-eNB to LMF, data for supporting the OTDOA positioning method, Cell-ID and Cell location ID for the NR Cell ID positioning method, and the like. The AMF may route NRPPa PDUs based on the routing ID of the associated LMF through the NG-C interface even if there is no information on the associated NRPPa transaction.

The procedure of the NRPPa protocol for location and data collection can be divided into two types. The first type is a UE associated procedure for delivering information on a specific UE (e.g. location measurement information, etc.), and the second type is a non-UE associated procedure for delivering information applicable to an NG-RAN node and related TPs (e.g. gNB/ng-eNG/TP timing information, etc.). The two types of procedures may be supported independently or at the same time.

NRPPa Procedure

A signal transmission/reception operation based on the NRPPa protocol to which the embodiments proposed in the present disclosure can be applied may be performed based on Table 10 below.

TABLE 10

| |
|---|
| Positioning and data acquisition transactions between a LMF and NG-RAN node are modelled by using procedures of the NRPPa protocol. There are two types of NRPPa procedures: |
| UE associated procedure, i.e. transfer of information for a particular UE (e.g. positioning measurements); |
| Non UE associated procedure, i.e. transfer of information applicable to the NG-RAN node and associated TPs (e.g. gNB/ng-eNB/TP timing information). |
| Parallel transactions between the same LMF and NG-RAN node are supported; i.e. a pair of LMF and NG-RAN node may have more than one instance of an NRPPa procedure in execution at the same time. |
| For possible extensibility, the protocol is considered to operate between a generic “access node” (e.g. ng-eNB) and a “server” (e.g. LMF). A procedure is only initiated by the server. |
| Example of a single NRPPa transaction |
| 1. Access Node sends NRPPa Procedure Request to Server. |
| 2. Server sends NRPPa Procedure Response to Acces Node. |
| N. Access Node sends NRPPa Procedure Response (end transaction) to Server. (this step may be omitted). |
| The exmaple shows a single NRPPa transaction. The transaction is terminated in step 2 in the case of a non UE associated procedure. For a UE associated procedure to gather information concerning the access node, additional responses may be allowed (e.g. sending of updated information periodically and/or whenever there is some significant change). In this case, the transaction may be ended after some additional responses. In the NRPPa protocol, the described transaction may be realized by the execution of one procedure defined as a request and a response, followed by one or several procedures initiated by the NG-RAN node (each procedure defined as a single message) to realize the additional responses. |
| An example of LPPa transaction type may be “Location Information Transfer”. The term “location information” applies both to an actual position estimate and to values used in computing position (e.g., radio measurements or positioning measurements). It is delivered in response to a request. |
| Example of Location Information transfer |
| 1. The server sends a request for location related information to the NG-RAN node, and indicates the type of location information needed and associated QoS. The request may refer to a particular UE. |
| 2. In response to step 1, the NG-RAN Node transfers location related information to the server. The location related information transferred should match the location related information requested in step 1. |
| 3. If requested in step 1, the NG-RAN node may transfer additional location related information to the server in one or more additional NRPPa messages when the positioning method is E-CID for E-UTRA. |

In the present disclosure, a message exchanged (transmitted and received) between a UE (a target device)/location server for positioning and a configuration related to the message may be based on Table 11 below.

Positioning Measurement Method

The positioning measurement methods supported by NG-RAN may include GNSS, OTDOA, E-CID (enhanced cell ID), Multi RTT (round trip time)/Multi-cell RTT, barometric pressure sensor positioning, WLAN positioning, Bluetooth positioning, and TBS (terrestrial beacon system), UTDOA (Uplink Time Difference of Arrival), etc. Among the positioning measurement methods, any one positioning measurement method may be used to measure the location of the UE, but two or more positioning measurement methods may be used to measure the location of the UE.

In the positioning measurement method described below, definitions of some terms may be based on Table 12 below.

TABLE 12

| | |
|---|---|
| | 5.1.13 Reference signal time difference (RSTD) for E-UTRA |
| Definition | The relative timing difference between the E-UTRA neighbour cell j and the E-UTRA reference cell i, defined as TSubframeRxj − TSubframeRxi, where: TSubframeRxj is the time when the UE receives the start of one subframe from E-UTRA cell j TSubframeRxi is the time when the UE receives the corresponding start of one subframe from E-UTRA cell i that is closest in time to the subframe received from E-UTRA cell j. The reference point for the observed subframe time difference shall be the antenna connector of the UE. |
| Applicable for | RRC_CONNECTED inter-RAT |
| | 5.1.28 DL PRS reference signal received power (DL PRS-RSRP) |
| Definition | DL PRS reference signal received power (DL PRS-RSRP), is defined as the linear average over the power contributions (in [W]) of the resource elements that carry DL PRS reference signals configured for RSRP measurements within the considered measurement frequency bandwidth.<br>For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
| Applicable for | RRC_CONNECTED intra-frequency,<br>RRC_CONNECTED inter-frequency |
| | 5.1.29 DL relative signal time difference (DL RSTD) |
| Definition | DL relative timing difference (DL RSTD) between the positioning node j and the reference positioning node i, is defined as TSubframeRxj − TSubframeRxi,<br>Where:<br>TSubframeRxj is the time when the UE receives the start of one subframe from positioning node j.<br>TSubframeRxi is the time when the UE receives the corresponding start of one subframe from positioning node i that is closest in time to the subframe received from positioning node j.<br>Multiple DL PRS resources can be used to determine the start of one subframe from a positioning node.<br>For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency<br>RRC_CONNECTED inter-frequency |
| | 5.1.29 DL reference signal time difference (DL RSTD) |
| Definition | DL reference signal time difference (DL RSTD) is the DL relative timing difference between the positioning node j and the reference positioning node i, defined as TSubframeRxj − TSubframeRxi,<br>Where:<br>TSubframeRxj is the time when the UE receives the start of one subframe from positioning node j.<br>TSubframeRxi is the time when the UE receives the corresponding start of one subframe from positioning node i that is closest in time to the subframe received from positioning node j.<br>Multiple DL PRS resources can be used to determine the start of one subframe from a positioning node.<br>For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency<br>RRC_CONNECTED inter-frequency |
| | 5.1.30 UE Rx − Tx time difference |
| Definition | The UE Rx − Tx time difference is defined as TUE-RX − TUE-TX<br>Where:<br>TUE-RX is the UE received timing of downlink subframe #i from a positioning node, defined by the first detected path in time.<br>TUE-TX is the UE transmit timing of uplink subframe #j that is closest in time to the subframe #i received from the positioning node.<br>Multiple DL PRS resources can be used to determine the start of one subframe of the first arrival path of the positioning node.<br>For frequency range 1, the reference point for TUE-RX measurement shall be the Rx antenna connector of the UE and the reference point for TUE-TX measurement shall be the Tx antenna connector of the UE. For frequency range 2, the reference point for TUE-RX measurement shall be the Rx antenna of the UE and the reference point for TUE-TX measurement shall be the Tx antenna of the UE. |
| Applicable for | RRC_CONNECTED intra-frequency<br>RRC_CONNECTED inter-frequency |

TABLE 12-continued

| 5.2.2 UL Relative Time of Arrival (TUL-RTOA) | |
|---|---|
| Definition | [The UL Relative Time of Arrival (TUL-RTOA) is the beginning of subframe i containing SRS received in positioning node j, relative to the configurable reference time.]<br>Multiple SRS resources for positioning can be used to determine the beginning of one subframe containing SRS received at a positioning node.<br>The reference point for TUL-RTOA shall be:<br>for type 1-C base station TS 38.104 [9]: the Rx antenna connector,<br>for type 1-O or 2-O base station TS 38.104 [9]: the Rx antenna,<br>for type 1-H base station TS 38.104 [9]: the Rx Transceiver Array Boundary connector. |
| 5.2.3 gNB Rx − Tx time difference | |
| Definition | The gNB Rx − Tx time difference is defined as TgNB-RX − TgNB-TX<br>Where:<br>TgNB-RX is the positioning node received timing of uplink subframe #i containing SRS associated with UE, defined by the first detected path in time.<br>TgNB-TX is the positioning node transmit timing of downlink subframe #j that is closest in time to the subframe #i received from the UE.<br>Multiple SRS resources for positioning can be used to determine the start of one subframe containing SRS.<br>The reference point for TgNB-RX shall be:<br>for type 1-C base station TS 38.104 [9]: the Rx antenna connector,<br>for type 1-O or 2-O base station TS 38.104 [9]: the Rx antenna,<br>for type 1-H base station TS 38.104 [9]: the Rx Transceiver Array Boundary connector.<br>The reference point for TgNB-TX shall be:<br>for type 1-C base station TS 38.104 [9]: the Tx antenna connector,<br>for type 1-O or 2-O base station TS 38.104 [9]: the Tx antenna,<br>for type 1-H base station TS 38.104 [9]: the Tx Transceiver Array Boundary connector. |
| 5.2.4 UL Angle of Arrival (UL AoA) | |
| Definition | UL Angle of Arrival (UL AoA) is defined as the estimated azimuth angle and vertical angle of a UE with respect to a reference direction, wherein the reference direction is defined:<br>In the global coordinate system (GCS), wherein estimated azimuth angle is measured relative to geographical North and is positive in a counter-clockwise direction and estimated vertical angle is measured relative to zenith and positive to horizontal direction<br>In the local coordinate system (LCS), wherein estimated azimuth angle is measured relative to x-axis of LCS and positive in a counter-clockwise direction and estimated vertical angle is measured relatize to z-axis of LCS and positive to x-y plane direction. The bearing, downtilt and slant angles of LCS are defined according to TS 38.901 [14].<br>The UL AoA is determined at the gNB antenna for an UL channel corresponding to this UE. |
| 5.2.5 UL SRS reference signal received power (UL SRS-RSRP) | |
| Definition | UL SRS reference signal received power (UL SRS-RSRP) is defined as linear average of the power contributions (in [W]) of the resource elements carrying sounding reference signals (SRS). UL SRS-RSRP shall be measured over the configured resource elements within the considered measurement frequency bandwidth in the configured measurement time occasions.<br>For frequency range 1, the reference point for the UL SRS-RSRP shall be the antenna connector of the gNB. For frequency range 2, UL SRS-RSRP shall be measured based on the combined signal from antenna elements corresponding to a given receiver branch. For frequency range 1 and 2, if receiver diversity is in use by the gNB, the reported UL SRS-RSRP value shall not be lower than the corresponding UL SRS-RSRP of any of the individual receiver branches. |

OTDOA (Observed Time Difference Of Arrival)

FIG. 12 is a diagram illustrating an example of an OTDOA positioning measurement method.

In the OTDOA positioning measurement method uses the measurement timing of downlink signals received by the UE from multiple TPs including an eNB, an ng-eNB, and a PRS-only TP. The UE measures the timing of the received downlink signals by using the location assistance data received from the location server. In addition, the location of the UE may be determined based on these measurement results and the geographic coordinates of the contiguous TPs.

A UE connected to the gNB may request a measurement gap for OTDOA measurement from the TP. If the UE does not recognize the SFN for at least one TP in the OTDOA assistance data, the UE may use the autonomous gap to obtain the SFN of the OTDOA reference cell before requesting the measurement gap for performing Reference Signal Time Difference (RSTD) measurement.

Here, the RSTD may be defined based on the smallest relative time difference between the boundaries of two subframes respectively received from the reference cell and the measurement cell. That is, it may be calculated based on the relative time difference between the start times of the subframes of the reference cell closest to the start time of the subframe received from the measurement cell. Meanwhile, the reference cell may be selected by the UE.

For accurate OTDOA measurement, it is necessary to measure the time of arrival (TOA) of a signal received from three or more geographically dispersed TPs or base stations. For example, the TOA for each of TP 1, TP 2 and TP 3 may be measured, the RSTD for TP 1-TP 2, the RSTD for TP 2-TP 3, and the RSTD for TP 3-TP 1 may be calculated based on the three TOAs, a geometric hyperbola may be determined based on this, and a point where these hyperbola intersects may be estimated as the location of the UE. In this case, since accuracy and/or uncertainty for each TOA measurement may occur, the estimated location of the UE may be known as a specific range depending on the measurement uncertainty.

For example, RSTDs for two TPs may be calculated based on Equation 3 below.

$$RSTD_{i,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \quad \text{[Equation 3]}$$

Here, c may be the speed of light, {xt, yt} may be the (unknown) coordinates of the target UE, {xi, vi} may be the coordinates of the (known) TP, and {25, y1} may be the coordinates of the reference TP (or other TP). Here, (Ti−T1) is a transmission time offset between two TPs, which may be referred to as "Real Time Differences" (RTDs), and ni and n1 may represent values related to UE TOA measurement errors.

E-CID (Enhanced Cell ID)

In the cell ID (CID) positioning measurement method, the location of the UE may be measured through geographic information of the serving ng-eNB, the serving gNB and/or the serving cell of the UE. For example, geographic information of the serving ng-eNB, the serving gNB, and/or the serving cell may be obtained through paging, registration, or the like.

Meanwhile, the E-CID positioning measurement method may use additional UE measurement and/or NG-RAN radio resources and the like for improving the UE location estimate in addition to the CID positioning measurement method. In the E-CID positioning measurement method, some of the same measurement methods as those of the measurement control system of the RRC protocol may be used, but in general, additional measurement is not performed only for the location measurement of the UE. In other words, a separate measurement configuration or measurement control message may not be provided to measure the location of the UE, and the UE also does not expect that an additional measurement operation only for location measurement will be requested, and the UE may report a measurement value obtained through generally measurable measurement methods.

For example, the serving gNB may implement the E-CID positioning measurement method using the E-UTRA measurement provided from the UE.

An example of a measurement element that can be used for E-CID positioning may be as follows.

UE measurement: E-UTRA RSRP (Reference Signal Received Power), E-UTRA RSRQ (Reference Signal Received Quality), UE E-UTRA reception-transmission time difference (Rx-Tx Time difference), GERAN/WLAN RSSI (Reference Signal Strength Indication), UTRAN CPICH (Common Pilot Channel) RSCP (Received Signal Code Power), UTRAN CPICH Ec/Io E-UTRAN measurement: ng-eNB reception-transmission time difference (Rx-Tx Time difference), timing advance (Timing Advance: TADV), Angle of Arrival (AoA)

Here, TADV may be divided into Type 1 and Type 2 as follows.

$$TADV\ \text{Type 1} = (ng\text{-}eNB\ \text{reception-transmission time difference}) + (UE\ E\text{-}UTRA\ \text{reception-transmission time difference})$$

$$TADV\ \text{Type 2} = ng\text{-}eNB\ \text{reception-transmission time difference}$$

On the other hand, AoA may be used to measure the direction of the UE. AoA may be defined as an estimated angle for the location of the UE in a counterclockwise direction from the base station/TP. In this case, the geographic reference direction may be north. The base station/TP may use an uplink signal such as a sounding reference signal (SRS) and/or a demodulation reference signal (DMRS) for AoA measurement. In addition, the larger the antenna array arrangement, the higher the AoA measurement accuracy, when the antenna arrays are arranged at the same interval, signals received from contiguous antenna elements may have a constant phase-rotate.

UTDOA (Uplink Time Difference of Arrival)

UTDOA is a method of determining the location of the UE by estimating the arrival time of the SRS. When calculating the estimated SRS arrival time, the location of the UE may be estimated through the difference in arrival time with another cell (or base station/TP) by using the serving cell as a reference cell. To implement UTDOA, the E-SMLC may instruct the serving cell of the target UE to instruct the target UE to transmit SRS. In addition, the E-SMLC may provide configuration such as whether the SRS is periodic/aperiodic, bandwidth, and frequency/group/sequence hopping, etc.

Multi RTT (Multi-Cell RTT)

Unlike OTDOA, which requires fine synchronization (e.g. nano-second level) between TPs in the network, RTT is based on TOA measurement like the OTDOA, but requires only coarse TRP (e.g. base station) timing synchronization. Hereinafter, it will be described in detail with reference to FIGS. 13A and 13B.

FIGS. 13A and 13B are diagrams illustrating an example of a Multi RTT positioning measurement method.

Referring to FIG. 13A, an RTT process, in which TOA measurement is performed in an initiating device and a responding device, and the responding device provides the TOA measurement to the initiating device for RTT measurement (calculation), is exemplified. For example, the initiating device may be a TRP and/or a UE, and the responding device may be the UE and/or the TRP.

In operation B801 based on an exemplary embodiment, the initiating device may transmit an RTT measurement request, and the responding device may receive it.

In operation B803 based on an exemplary embodiment, the initiating device may transmit an RTT measurement signal at t0, and the responding device may acquire a TOA measurement t1.

In operation B805 based on an exemplary embodiment, the responding device may transmit the RTT measurement signal at t2, and the initiating device may acquire a TOA measurement t3.

In operation B807 based on an exemplary embodiment, the responding device may transmit information on [t2−t1], and the initiating device may receive the corresponding information and calculate the RTT based on Equation 4 below. The corresponding information may be transmitted/received based on a separate signal, or may be transmitted/received by being included in the RTT measurement signal of B805.

$$RTT = t_3 - t_0 - [t_2 - t_1] \quad \text{[Equation 4]}$$

Referring to FIG. 13B, the corresponding RTT may correspond to double-range measurement between two devices. Positioning estimation may be performed from the corresponding information, and a multilateration technique may be used. Based on the measured RTT, d1, d2, and d3 may be determined, and the target device location may be determined by the intersection of the circumference with each BS1, BS2, BS3 (or TRP) as a center and each d1, d2, and d3 as a radius.

The above-described contents (3GPP system, positioning protocol, procedure for measuring the location of the UE, positioning measurement method, etc.) may be applied in combination with methods proposed in the present disclosure be described later, or may be supplemented to clarify the technical characteristics of the methods proposed in the present disclosure. Methods to be described below are divided for convenience of description, and of course, some components of any one method may be substituted with some components of another method, or may be applied in combination with each other. That is, the various embodiments of the present disclosure described below may be combined in whole or in part to constitute other various embodiments of the present disclosure unless mutually excluded, which can be clearly understood by those of ordinary skill in the art.

In terms of a typical physical channel, the positioning procedure can be performed as follows.

The UE transmits a request for a measurement gap to the base station/server to receive the PRS, and the base station/server transmits information on the measurement gap to the UE and transmits the PRS within the gap. The UE receives the PRS in the designated section (time section based on the measurement gap) and transmits a scheduling request for the UL channel to the base station/server to report the measurement results. The base station/server transmits scheduling information for the corresponding resource to the UE through the PDCCH, and the UE reports measurement results through the designated resource. But from Rel. 17, latency requirements are shorter than before, so additional mechanisms are needed to meet them. In general, the time taken by the UE for DL positioning measurement is at least a multiple of the lowest common multiple of the periodicity (T_PRS) for the DL PRS resource and the periodicity (T_measGap) for the measurement gap, and the range of the values is {20, 40, 80, 160, 320, 640, 1280, 2560, 5120, 10240} (ms). This is greater than the 10 ms physical layer latency targeted in Rel-17.

The present disclosure describes a method of reducing the latency in measuring the position of the UE in terms of the physical layer.

Procedures related to position measurement in the physical layer will be described with reference to FIG. 14.

FIG. 14 illustrates a positioning measurement procedure from a physical layer perspective to which a method proposed in the present disclosure can be applied. Specifically, FIG. 14 illustrates a procedure related to grant-based DL-positioning measurement.

Referring to FIG. 14, the UE delivers/transmits a measurement gap request to the base station for PRS measurement (①).

The base station delivers/transmits information on measurement gap configuration to the UE (②).

The UE receives PRS resource(s) and/or PRS resource sets configured within the designated gap. In other words, the base station transmits the PRS resource(s)/PRS resource set(s) configured within the time interval according to the measurement gap to the UE (Measurement gap and PRS transmission/reception). As described above, the UE performs PRS measurement in a time interval according to the measurement gap.

The UE requests resource allocation to report PRS measurement results. Specifically, the UE requests resources for UL data (i.e. PRS measurement results) to be transmitted. In other words, the UE transmits a scheduling request to the base station through PUCCH (③).

The base station allocates UL resources so that the UE can report measurement results in response to the scheduling request. Specifically, the base station transmits an uplink grant (UL grant) to the UE through PDCCH (④).

The UE delivers the results of PRS measurement through allocated resources. Specifically, based on the UL grant, a UL resource (PUSCH resource) for reporting the results of PRS measurement may be determined. The UE reports the measurement result to the base station through PUSCH (⑤).

Below, it is described a method for reducing latency in the following two aspects.

Case #1) Reduction of latency related to time required for measurement itself related to measurement gap and PRS resource(s)

Case #2) Reduction of latency related to measurement report operation

The UE is allocated information on the PRS resource(s)/PRS resource set(s) to be measured through assistance data. In addition, the UE also receives information on the measurement gap in which measurement of the PRS is performed.

In general, measurement of PRS may mean measuring PRS resources existing within a measurement gap. However, even if there is no configuration for the measurement gap, the UE can utilize designated PRS resources for positioning measurement. The UE may have multiple TRPs configured, but does not need to measure all configured TRPs. That is, the location server (LMF) may indicate the UE to measure a specific DL PRS resource(s) or set, and if the UE immediately reports the measurement results, it may be advantageous in terms of latency.

That is, the UE receives and measures only the specific PRS transmitted within the measurement duration associated with the specified measurement gap periodicity and periodicity of the PRS resource. If the UE requests a measurement report or performs a report before the measurement duration ends, there may be a benefit in terms of time latency.

Case #1

Below, methods for latency reduction related to the measurement gap are described. Specifically, it is described a method of shortening the actual measurement duration by limiting the PRS resource(s)/PRS resource set(s)/TRP(s) measured by the UE in the base station/server.

As an example, the base station/server (e.g. location server, Location Management Function (LMF)) may configure the UE to limit the number of PRS resources/TRPs related to the PRS measurement operation to a certain number (e.g. maximum and/or minimum number).

Specifically, the base station/server may configure at least one of the following i) to iii) to a certain value in the UE. The certain value may mean the maximum number or minimum number.

i) Number of PRS resources related to PRS measurement
ii) Number of PRS resource sets related to PRS measurement
iii) Number of TRPs related to PRS (number of TRPs transmitting PRS, number of TRPs from which the UE receives PRS)

As an example, the maximum or minimum number may be configured in any one of i) to iii) above (e.g. maximum (minimum) number of PRS resources). As an example, the maximum or minimum number may be configured in two or more of i) to iii) above (e.g. maximum (minimum) number of PRS resources, minimum (maximum) number of PRS resource sets). As an example, the maximum or minimum number may be configured in each of i) to iii) above (e.g. maximum (minimum) number of PRS resources, minimum (maximum) number of PRS resource sets). The above-described combinations are merely examples prepared for convenience of explanation, and are not intended to limit the scope of technical ideas related to the present embodiment to some items. That is, the value configured for any one of i) to iii) above can be configured individually regardless of the value configured for the remaining items (e.g. the value of maximum number/minimum number).

For example, restrictions on the maximum/minimum number of PRS resources may be applied as follows. The number of PRS resources may be counted from the PRS resource that the UE first measures, and may mean the number of PRS resources themselves measured by the UE regardless of the PRS resource set and TRP. These operations/configurations may be equally applied to the maximum or minimum number of PRS resource sets or TRPs.

According to the present embodiment, the value for the measurement window to be measured by the UE is indirectly indicated through (the number of) the PRS resources/PRS resource set/TRP. That is, the measurement window may be limited based on the number of configured PRS resources/PRS resource set/TRP, and the time required for measurement of the UE may be reduced.

Priority rules for DL RS resource(s) monitored by the UE may be based on Table 13 below.

TABLE 13

| |
|---|
| Within a positioning frequency layer, the DL PRS resources are sorted in the decreasing order of priority for measurement to be performed by the UE, with the reference indicated by nr-DL-PRS-ReferenceInfo being the highest priotity for measurement, and the following priority is assumed: |
| Up to 64 dl-PRS-IDs of the frequency layer are sorted according to priority |
| Up to 2 DL PRS resource sets per dl-PRS-ID of the frequency later are sorted according to priority. |

The base station/server may directly indicate measurement for a specific PRS resource using the descending order (Table 13 above) related to the priority for PRS resources to be measured in the UE.

For example, the number configured for i) to iii) described above may be indicated as follows. The base station/server may operate as follows to indicate measurement for the specific PRS resource.

As an example, the base station/server may directly indicate the UE in the form of a bitmap for at least one of the PRS resource, PRS resource set, and/or TRP arranged in descending order through a hierarchical structure. This method may be applied in the same way as the muting method for SRS.

As an example, the base station/server may directly indicate an index for at least one of the PRS resource, PRS resource set, and/or TRP arranged in descending order. The base station/server may configure the UE to operate as follows based on the indicated index. The UE may perform measurements only up to the indicated index based on the descending order and report the measurement results. As described above, as the number of DL PRSs to be measured by the UE is limited, latency may also decrease.

Case #2

Below, it is described methods for latency reduction related to the reporting and request. The procedures related to measurement reporting and requests are another key component from a physical layer perspective due to the sorting time and processing latency required for each procedure. From this perspective, physical layer latency may be reduced if specific procedures can be omitted. For example, when a message for measurement gap configuration is accompanied by UL grant information, latency may be reduced. For example, when a message for a measurement gap request includes a scheduling request for measurement report and/or a Buffer Status Report (BSR), latency may be reduced.

The base station transmits uplink grant (UL grant) information to the UE based on a scheduling request received from the UE.

When a measurement request is made, the base station/server transmits related information together to report the result obtained through a specific positioning method. In general, since the base station/server can know the amount of information reported by the UE, no additional operation for resource allocation is performed after transmission of the UL grant. However, if a specific environment is assumed, additional procedures for resource allocation may be performed. As an example, it may be assumed that at the time point the base station transmits UL grant information, available UL resources are insufficient. At this time, the base station delivers allocable resources to the UE, and then the base station can additionally allocate UL resources based on the Buffer Status Report (BSR) reported from the UE. The UE may transmit remaining data through resources additionally allocated from the base station.

Due to the above additional procedures, latency may increase rapidly. For use cases where latency is important, configurations/operations may be performed to reduce latency caused by continuous measurement reports. Specifically, the base station/server may configure information related to the number of measurement reports to the UE. As an example, the base station/server may configure the UE to perform a one shot measurement report or N shot measurement report (i.e. one-time measurement report/N-time measurement report).

For example, if one shot measurement report is configured, the UE may report the measurement results as follows. The UE may report measurement results considering designated (allocated) resources. The UE transmits the high priority element first based on the priority of the designated information element (e.g. elements of information representing the measurement result). The UE discards elements that were not transmitted or later transmits the remaining elements in the n-th measurement report.

As an example, a value related to the number of measurement reports (single shot or multiple shot) may be configured/indicated through system information, RRC signaling, MAC CE, or DCI.

As an example, a value related to the number of measurement reports may be configured/defined in advance as a default value (e.g. single shot measurement report).

Priority for information elements for measurement results obtained based on each positioning method may be defined in advance. For example, when common IE (e.g. CommonIEsProvideLocationInformation) is configured to the highest priority among information elements about measurement results, or when reporting measurement results based on each method, for example, based on OTDOA, there may be a priority rule such as transmitting information related to signal measurement first. That is, the UE transmits measurement results through designated resources by considering the priorities among IEs.

Additionally, it is described methods that can benefit in terms of latency by simplifying procedures related to scheduling request/grant below.

Method 1

A method of delivering UL grant information through configuration for a measurement gap may be considered.

According to this embodiment, uplink resources may be allocated in advance to reduce latency regardless of whether the UE transmits a scheduling request or not. Specifically, when the base station/server receives a request for a measurement gap from the UE, the base station/server may pre-allocate uplink resources to be used, by the UE, for reporting and transmit them along with configuration information on the measurement gap. As an example, the configuration information for measurement gap (LPP message) may include information on uplink resources for measurement reporting.

Because resources are allocated in advance, it may be inefficient in terms of resource utilization to apply modulation differently (apply modulation orders differently) depending on the channel status. However, these disadvantages can be offset by the following effects. Resources for time/frequency/power consumed to transmit a scheduling request from the UE and resources consumed to transmit a grant from the base station are reduced. Additionally, since resources are determined without scheduling requests and UL grant-related signaling, it can bring more benefits in terms of latency.

Method 2

To report the measurement results of PRS, a method of utilizing preconfigured resources based on a grant-free method may be considered.

The grant free method is a method introduced to reduce the latency of data transmission used in the URLLC (Ultra-Reliable Low-Latency Communication) system. According to this embodiment, the grant-free method may be introduced for positioning of the NR system. This will be described in detail below.

Resources for reporting on positioning measurement may be configured in advance through system information and/or RRC signaling. A PUSCH resource area is pre-allocated based on the system information and/or RRC signaling, and the UE transmits measurement results in the corresponding area. That is, the UE may transmit (report) the results of PRS measurement based on the PUSCH resource within the preconfigured resource area. At this time, multiple UEs may share the same area (i.e. PUSCH resource area). Data transmitted by each UE may be configured/transmitted to be differentiated using a code domain. That is, data (measurement results) transmitted by a plurality of UEs in the PUSCH resource area may be transmitted based on code division multiplexing (CDM). The above-described embodiment assumes that the UE is in the RRC connected state, but is not limited thereto. That is, the above-described embodiment may be applied even when the UE is in a state other than the RRC connected state (e.g. RRC inactive state, RRC idle state). As an example, the UE in the RRC inactive state may transmit PRS measurement results through the PUSCH resource area. As an example, the UE in the RRC idle state may transmit PRS measurement results through the PUSCH resource area.

According to this embodiment, resources for reporting measurement results are determined without scheduling requests and UL grant-related signaling, so latency is reduced.

Method 3

A method in which the UE transmits information on a buffer status report (BSR) to the base station in advance may be considered.

In general, if the UE has a lot of data to transmit on the PUSCH and cannot transmit all of it through the designated resource, the UE transmits information on the buffer status to the PUSCH through BSR. That is, if there is data left to be transmitted by the UE, resources are allocated again and transmission of the data is performed again. Therefore, an additional two-step procedure is performed compared to the existing three-step procedure (measurement gap request/configuration, resource allocation, and measurement reporting). That is, latency increases in that the two-step procedure of resource allocation and measurement result transmission are additionally performed to transmit the remaining data.

According to this embodiment, in order to prevent the increase in latency as described above, when the UE transmits a scheduling request, it can also transmit BSR information on the data to be transmitted. In other words, since the UE has already completed the measurement before the scheduling request, the UE may predict in advance the amount of resources for reporting measurement results, at least from a positioning perspective. The UE may transmit information on the BSR (e.g. n bit information) by including it in a scheduling request. The base station may consider information on the corresponding BSR when generating UL grant information. In other words, the base station may allocate resources where measurement results can be reported at once based on the BSR information included in the scheduling request.

Through the above operation, the increase in latency caused by the problem of lack of resources for PUSCH can be solved. If the amount of resources required according to the BSR information included in the scheduling request is large, the following operation can be considered.

As an example, the base station may include allocation information for a plurality of time/frequency resources in one grant and transmit the one grant to the UE. That is, by transmitting one grant including discontinuous resources, resources and time consumed for additional grants can be saved.

For example, if the amount of data to be sent is large compared to the resources designated by the UE (by UL grant), the UE may report measurement results using only the designated resources. Specifically, the UE may rearrange and organize data to be sent by applying a set data priority. The UE may transmit data arranged/organized based on the priority using only designated (allocated) resources. An example of the data priority is as follows.

The priority for data (measurement results) reported by the UE may be defined/determined/configured in advance using TRP information, PRS information, RSRP results, time stamp, Rx beam index, etc. For example, if only data up to the time stamp can be transmitted through the designated resource, the UE does not report data with a subsequent priority, such as the Rx beam index.

Information on the data priority may be defined/configured in advance. As an example, information on the data priority may be indicated through an LPP message such as system information and/or request location information.

This embodiment may be applied in combination with the methods described above.

Method 4

A method of transmitting a grant after a certain period of time has elapsed after the measurement gap may be considered.

According to this embodiment, the base station may transmit a UL grant to the UE at a specific time point without a scheduling request of the UE. That is, the UE may not transmit a scheduling request for allocation of resources for reporting measurement results, and the UE may expect to receive the UL grant at the specific time point.

The specific time point may be based on a time point after the measurement gap. Specifically, the specific time point may be determined based on the measurement gap and a predefined value. As an example, the base station may transmit grant information to the UE after an x symbol, y slot, or z subframe after the measurement gap. The UE may receive the grant information from the base station at a specific time point when a certain amount of time (e.g. x symbol/y slot/z subframe) has elapsed after the measurement gap.

The corresponding x, y, and z values may be predefined or flexibly indicated through system information. Information on the frequency (resource) at which the grant information is transmitted may be predefined as an active BWP or a BWP through which a PRS is transmitted.

In addition, parameters related to transmission, such as MCS (Modulation and Coding Scheme), or values for the time/frequency resource above may be transmitted through an LPP message such as system information or measurement gap configuration.

The reason for configuring an offset for the time point when the grant is transmitted as described above (e.g. x symbol/y slot/z subframe) is to ensure the minimum times related to the operation of the base station/UE. That is, the offset value (e.g. x symbol/y slot/z subframe) for determining the specific time point may be configured based on the time required to provide the minimum time for the base station's grant generation operation and the preparation operation for the UE to receive PRS and generate and report measurement results. The offset value may be configured differently depending on the capacity of the UE. FIG. 15 illustrates operation based on Method 4.

FIG. 15 illustrates a simplified positioning measurement procedure according to an embodiment of the present disclosure.

Since the operations ①, ②, and ④ in FIG. 15 are the same as ①, ②, and ⑤ in FIG. 14, duplicate descriptions will be omitted.

The UE measures the PRS, expects to receive grant information after a designated time (Waiting time for grant reception), and performs blind decoding the PDCCH. That is, the UE may receive a UL grant from the base station by performing blind decoding on the PDCCH at a specific time point after the measurement gap (③).

The base station may automatically recognize that the UE will report the results later while receiving a measurement gap request from the UE. The base station may transmit grant information for PUSCH to the UE at a predefined time after the measurement gap.

Through this embodiment, the UE does not transmit a separate scheduling request, thereby improving resource utilization and reducing latency.

Method 5

A method of reporting measurement results using a scheduling request may be considered.

According to this embodiment, when the UE transmits a scheduling request for PUSCH transmission, the measurement result value may be transmitted together.

For example, when delivering results included in PUCCH (scheduling request), the UCI (Uplink Control Information) field is very limited, so some of the measurement results (some of the information elements representing the measurement results) may be transmitted through the PUCCH. Information reported through the PUCCH may be information determined to be the most important information among the measurement results. Information reported through the PUCCH may be predefined or may be indicated to the UE through system information or an LPP message.

As an example, rather than using the PUCCH format corresponding to the scheduling request, the measurement result may be reported through a new PUCCH format. The UCI bit field of the corresponding PUCCH format may include scheduling information for the PUSCH to be transmitted later. That is, according to this embodiment, the UE directly selects transmission resources for the PUSCH and informs the base station of information about them.

It is clear that examples of the proposed methods described above can also be included as one of the various embodiments of the present disclosure, and thus can be regarded as a type of proposed methods. Additionally, the proposed methods described above may be implemented independently, but may also be implemented in the form of a combination (or merge) of some of the proposed methods. A rule may be defined so that the base station informs the UE of the application of the proposed methods (or information on the rules of the proposed methods) through a predefined signal (e.g. a physical layer signal or a higher layer signal).

The above-described embodiments (e.g. at least one of Case #1, Case #2, Method 1, Method 2, Method 3, Method 4, and/or Method 5) can be applied when the RRC state of the UE is RRC connected state. However, it is not limited to this, and the above-described embodiments (e.g. at least one of Case #1, Case #2, Method 1, Method 2, Method 3, Method 4, and/or Method 5) can be applied even when the RRC state of the UE is RRC inactive state or RRC idle state.

In terms of implementation, the operations of the UE/base station/location server according to the above-described embodiments (e.g. operations based on at least one of Case #1, Case #2, Method 1, Method 2, Method 3, Method 4, and/or Method 5) may be processed by the devices (e.g. processors 102, 202 in FIG. 21) of FIGS. 20 to 24, which will be described later.

Additionally, the operations of the UE/base station/location server according to the above-described embodiment (e.g. operations based on at least one of Case #1, Case #2, Method 1, Method 2, Method 3, Method 4, and/or Method 5) may be stored in memory (e.g. 104, 204 in FIG. 21) in the form of instructions/programs (e.g. instruction, executable code) for driving at least one processor (e.g. 102, 202 in FIG. 21).

Hereinafter, operations of a UE, a base station (TRP), and a location server (LMF) to which the above-described embodiments can be combined and applied will be described in detail with reference to FIGS. 16 and 17.

FIG. 16 is a diagram illustrating operations of a UE, TRP, and LMF to which a method proposed in the present disclosure can be applied.

Referring to FIG. 16, in operation 2001 according to an exemplary embodiment, the location server and/or the LMF may transmit configuration information to the UE, and the UE may receive it.

Meanwhile, in operation 2003 according to an exemplary embodiment, the location server and/or the LMF may transmit reference configuration information to a transmission and reception point (TRP), and the TRP may receive it. In operation 2005 according to an exemplary embodiment, the TRP may transmit reference configuration information to the UE, and the UE may receive it. In this case, the operation 2001 according to the exemplary embodiment may be omitted.

Conversely, the operations 2003 and 2005 according to an exemplary embodiment may be omitted. In this case, the operation 2001 according to the exemplary embodiment may be performed.

That is, the operations 2001 according to an exemplary embodiment and the operations 2003 and 2005 according to an exemplary embodiment may be optional.

In operation 2007 according to an exemplary embodiment, the TRP may transmit a signal related to configuration information to the UE, and the UE may receive it. For example, the signal related to the configuration information may be a signal for positioning of the UE.

In operation 2009 according to an exemplary embodiment, the UE may transmit a signal related to positioning to the TRP, and the TRP may receive it. In operation 2011 according to an exemplary embodiment, the TRP may transmit the signal related to positioning to the location server and/or the LMF, and the location server and/or the LMF may receive it.

Meanwhile, in operation 2013 according to an exemplary embodiment, the UE may transmit the signal related to positioning to the location server and/or the LMF, and the location server and/or the LMF may receive it. In this case, operations 2009 and 2011 according to the exemplary embodiment may be omitted.

Conversely, operation 2013 according to an exemplary embodiment may be omitted. In this case, operations 2009 and 2011 according to the exemplary embodiment may be performed.

That is, operations 2009 and 2011 according to an exemplary embodiment and operations 2013 according to an exemplary embodiment may be optional.

In an exemplary embodiment, the signal related to positioning may be obtained based on the configuration information and/or the signal related to the configuration information.

FIG. 17 is a flowchart for explaining an operation of each UE, TRP and LMF to which a method proposed in the present disclosure can be applied.

Referring to (a) of FIG. 17, in operation 2101 according to an exemplary embodiment, the UE may receive configuration information. In operation 2103 according to an exemplary embodiment, the UE may receive a signal related to configuration information. In operation 2105 according to an exemplary embodiment, the UE may transmit information related to positioning.

Referring to (b) of FIG. 17, in operation 2201 according to an exemplary embodiment, the TRP may receive configuration information from the location server and/or the LMF, and may transmit it to the UE. In operation 2203 according to an exemplary embodiment, the TRP may transmit the signal related to configuration information. In operation 2205 according to an exemplary embodiment, the TRP may receive information related to positioning, and may transmit it to the location server and/or the LMF.

Referring to (c) of FIG. 17, in operation 2301 according to an exemplary embodiment, the location server and/or the LMF may transmit the configuration information. In operation 2305 according to an exemplary embodiment, the location server and/or the LMF may receive the information related to positioning.

More specific operations, functions, terms, etc. in the operation according to each exemplary embodiment may be performed and described in combination with at least one of the various embodiments described above and the embodiments to be described later.

Hereinafter, the above-described embodiments (FIGS. 7 to 17) will be described in detail with reference to FIG. 18 in terms of the operation of the UE. Methods to be described below are divided for convenience of description, unless mutually excluded, and of course, some components of any one method may be substituted with some components of another method, or may be applied in combination with each other.

FIG. 18 is a flowchart illustrating a method for a UE to transmit information on measurement of PRS in a wireless communication system according to an embodiment of the present disclosure.

Referring to FIG. 18, a method for transmitting information on measurement of a positioning reference signal (PRS) by a user equipment (UE) in a wireless communication system according to an embodiment of the present disclosure includes transmitting a message for requesting a measurement gap (S1810), receiving configuration information related to the measurement gap (S1820), receiving the PRS (S1830), and transmitting information on measurement of the PRS (S1840).

In S1810, the UE transmits the message for requesting the measurement gap to the base station. The message for requesting the measurement gap may be an LPP message or an RRC message (e.g. upper layer parameter NR-PRS-MeasurementInfoList).

According to the above-described S1810, the operation of transmitting a message for requesting a measurement gap by the UE (100/200 in FIGS. 20 to 24) to the base station (100/200 in FIGS. 20 to 24) may be implemented by the device of FIGS. 20 to 24. For example, referring to FIG. 21, one or more processors 102 may control one or more transceivers 106 and/or one or more memories 104 to transmit a message for a request for a measurement gap to the base station 200.

In S1820, the UE receives configuration information related to the measurement gap from the base station. The configuration information related to the measurement gap may be based on an LPP message or an RRC message (e.g. mgl in the upper layer parameter GapConfig). For example, the length of the measurement gap may be configured based on configuration information related to the measurement gap (e.g. x ms).

According to one embodiment, the configuration information may include information related to measurement of the PRS. This embodiment may be based on the embodiment related to Case #1 described above. Based on information related to the measurement of the PRS, the number of PRS resources measured by the UE may be limited to a certain number. The number of PRS resources measured (monitored) by the UE may be determined based on at least one of the number of PRS resources, the number of PRS resource sets (a PRS resource set includes one or more PRS resources), and/or the number of TRPs transmitting PRS (number of TRPs receiving PRS). That is, the information related to the measurement of the PRS may include information on at least one of i) maximum or minimum number of the PRS resources, ii) minimum or maximum number of PRS resource sets and/or iii) maximum or minimum number of transmission and reception points (TRPs) related to the PRS.

According to one embodiment, the configuration information may include information representing a number of reports of the information on measurement of the PRS. This embodiment may be based on the embodiment related to Case #2 described above. Transmission of the information on the measurement of the PRS may be performed based on the number of reports. As an example, the number of reports may be configured to 1 (one shot measurement report). As an example, the number of reports may be configured to a value of 2 or more (multiple shot measurement report).

At this time, based on the number of reports being configured to 1 and the information on the measurement of the PRS being greater than information that can be transmitted through the preconfigured resource, only some of the information elements representing information on the measurement of the PRS may be transmitted. Specifically, one or more information elements among information elements representing the information on the measurement of the PRS may be determined, and the one or more information elements may be transmitted. The one or more information elements may be transmitted based on a predefined priority.

According to one embodiment, the configuration information may include UL grant information. This embodiment may be based on Method 1 described above. Specifically, to reduce latency, uplink resources can be pre-allocated through configuration information related to the measurement gap regardless of whether the terminal transmits a scheduling request. Specifically, uplink resources may be allocated in advance to reduce latency through configuration information related to the measurement gap regardless of whether the UE transmits a scheduling request or not.

According to the above-described S1820, the operation of receiving configuration information related to the measurement gap by the UE (100/200 in FIGS. 20 to 24) from the base station (100/200 in FIGS. 20 to 24) may be performed in FIGS. 20 to 24. For example, referring to FIG. 21, one or more processors 102 may control one or more transceivers 106 and/or one or more memories 104 to receive the configuration information related to the measurement gap from a base station 200.

In S1830, the UE receives the PRS from the base station based on the measurement gap. The base station may be based on the Reference Source (e.g. Transmission and Reception Point (TRP)) of FIG. 7, and the PRS may be based on the radio signals of FIG. 7. The S1830 may be based on the operation 2007 of FIG. 16 and the operation 2103 of FIG. 17. Reception of the PRS may be performed as defined in Tables 6 and 7 above.

The UE may receive the PRS within a time interval based on the measurement gap. In other words, the measurement for the PRS may be performed within a time interval based on the measurement gap.

According to the above-described S1830, the operation of receiving the PRS based on the measurement gap from the base station (100/200 in FIGS. 20 to 24) by the UE (100/200 in FIGS. 20 to 24) may be implemented by the device of FIGS. 24 to 24. For example, referring to FIG. 21, one or more processors 102 may control one or more transceivers 106 and/or one or more memories 104 to receive the PRS based on the measurement gap from a base station 200.

In S1840, the UE transmits information on the measurement of the PRS to the base station. The S1840 may be based on operations 2009 and 2011 of FIG. 16 and operations 2105 of FIG. 16. That is, information on the measurement of the PRS may be transmitted from the UE to the location server through the base station (TRP).

Transmission of information on the measurement of the PRS may be performed as defined in Table 7 above. As an example, the information on the measurement of the PRS may include Reference Signal Time Difference (RSTD) related to the PRS and/or Reference Signal Received Power (RSRP) related to the PRS.

According to one embodiment, transmission of information on the measurement of the PRS may be performed based on a protocol for positioning. As an example, information on the PRS measurement may be transmitted based on LTE Positioning Protocol (LPP).

The information on the measurement of the PRS may be transmitted based on preconfigured resources. The preconfigured resource may be a resource determined/configured based on at least one of Case #1, Case #2, and Method 1 to Method 5 described above.

As an example, the preconfigured resource may be determined based on the configuration information. This embodiment may be based on Method 1 above. Specifically, the configuration information may include UL grant information. The preconfigured resource may be determined based on UL grant information included in the configuration information.

As an example, the preconfigured resources may be based on resources configured for grant-free transmission. This embodiment may be based on Method 2 above. Specifically, the PUSCH resource area may be configured in advance for the grant-free transmission (i.e. UL transmission without resource allocation based on the UL grant). The preconfigured resources may be based on resource(s) within the PUSCH resource area. This embodiment may be performed based on the RRC state of the UE. For example, based on the fact that the RRC state of the UE is RRC inactive state (or RRC idle state), the information on the measurement of the PRS may be transmitted through resources configured for the grant-free transmission. As an example, based on the fact that the RRC state of the UE is RRC connected state, the information on the measurement of the PRS may be transmitted through resources configured for the grant-free transmission.

As an example, Buffer Status Report (BSR) information related to the preconfigured resource may be included in a scheduling request (SR) and transmitted. The preconfigured resources may be determined based on an uplink grant (UL grant) related to the SR. This embodiment may be based on Method 3 above.

As an example, the preconfigured resource may be determined based on an uplink grant (UL grant) received at a predefined time point after the measurement gap. This embodiment may be based on Method 4 above. The predefined time point may be determined based on the measurement gap and a preconfigured offset. The preconfigured offset may be configured in units based on at least one of a symbol, a slot, or a subframe. The value of the preconfigured offset may be configured based on a capability of the UE. The capability of the UE may be related to the time required for operations related to measurement of the PRS.

As an example, the preconfigured resource may be based on a physical uplink control channel (PUCCH) resource for transmission of a scheduling request (SR). This embodiment may be based on Method 5 above.

According to one embodiment, transmission of information on the measurement of the PRS may be performed based on the number of reports configured through the configuration information. For example, if the number of reports is 1, transmission of information on the measurement of the PRS may be performed only once.

It may be assumed that the number of reports is configured to 1 and information on the measurement of the PRS is greater than information that can be transmitted through the preconfigured resource (i.e. measurement results cannot be transmitted at once through the preconfigured resources). At this time, only some of the information elements representing information on the measurement of the PRS may be transmitted.

Specifically, one or more information elements among information elements representing information on the measurement of the PRS may be determined, and the one or more information elements may be transmitted through the preconfigured resource.

According to the above-described S1840, the operation of transmitting information on the measurement of the PRS by the UE (100/200 in FIGS. 20 to 24) to the base station (100/200 in FIGS. 20 to 24) may be implemented by the device of FIGS. 20 to 24. For example, referring to FIG. 21, one or more processors 102 may control one or more transceivers 106 and/or one or more memories 104 to transmit the information on the measurement of the PRS to the base station 200.

The method may further include receiving configuration information related to the PRS. Specifically, the UE receives configuration information related to the PRS from the base station/location server. As an example, the location server may refer to the Location Management Function (LMF) of FIG. 7. The operation may be based on operations 2001, 2003, and 2005 of FIG. 16, and operations 2101 of FIG. 17. That is, the configuration information related to the PRS may be i) transmitted directly from the location server to the UE, or ii) delivered from the location server to the UE through the base station (TRP).

As an example, the configuration information related to the PRS may include DL PRS resource set and/or DL-PRS-Resource, which are upper layer parameters based on Table 7 above. However, it is not limited to this, and the configuration information related to the PRS may further include other upper layer parameters defined in Table 7 above.

The configuration information related to the PRS may be received based on a protocol for positioning. As an example, the configuration information related to the PRS may be received based on LPP (LTE Positioning Protocol).

According to the above-described steps, the operation of receiving the configuration information related to the PRS from the location server/base station (100/200 in FIGS. 20 to 24) by the UE (100/200 in FIGS. 20 to 24) may be implemented by the device of FIGS. 20 to 24. For example, referring to FIG. 21, one or more processors 102 may control one or more transceivers 106 and/or one or more memories 104 to receive the configuration information related to the PRS from the location server/base station 200.

Hereinafter, the above-described embodiments (FIGS. 7 to 17) will be described in detail with reference to FIG. 19 in terms of operation of the base station. The methods described below are separated for convenience of explanation, and unless they are mutually exclusive, some components of one method may be replaced with some components of another method, or may be applied in combination with each other.

FIG. 19 is a flowchart illustrating a method for a base station to receive information on measurement of PRS in a wireless communication system according to another embodiment of the present disclosure.

Referring to FIG. 19, a method for receiving information on measurement of a positioning reference signal (PRS) by a base station in a wireless communication system according to another embodiment of the present disclosure includes receiving a message for requesting a measurement gap (S1910), transmitting configuration information related to the measurement gap (S1920), transmitting a PRS (S1930), and receiving information on measurement of the PRS (S1940).

In S1910, the base station receives a message for requesting a measurement gap from the UE. The message for requesting the measurement gap may be an LPP message or an RRC message (e.g. upper layer parameter NR-PRS-MeasurementInfoList).

According to the above-described S1910, an operation of receiving a message for requesting a measurement gap by the base station (100/200 in FIGS. 20 to 24) from the UE (100/200 in FIGS. 20 to 24) may be implemented by the device of FIGS. 20 to 24. For example, referring to FIG. 21, one or more processors 202 may control one or more transceivers 206 and/or one or more memories 204 to receive the message for requesting the measurement gap from the UE 100.

In S1920, the base station transmits the configuration information related to the measurement gap to the UE. The configuration information related to the measurement gap may be based on an LPP message or an RRC message (e.g. mgl in the upper layer parameter GapConfig). For example, the length of the measurement gap may be configured based on configuration information related to the measurement gap (e.g. x ms).

According to one embodiment, the configuration information may include information related to measurement of the PRS. This embodiment may be based on the embodiment related to Case #1 described above. Based on information related to the measurement of the PRS, the number of PRS resources measured by the UE may be limited to a certain number.

The number of PRS resources measured (monitored) by the UE may be determined based on at least one of the number of PRS resources, the number of PRS resource sets (a PRS resource set includes one or more PRS resources), and/or the number of TRPs transmitting PRS (number of TRPs receiving PRS). That is, the information related to the measurement of the PRS may include information on at least one of i) maximum or minimum number of the PRS resources, ii) minimum or maximum number of PRS resource sets and/or iii) maximum or minimum number of transmission and reception points (TRPs) related to the PRS.

According to one embodiment, the configuration information may include information representing a number of reports of the information on measurement of the PRS. This embodiment may be based on the embodiment related to Case #2 described above. Reception of the information on the measurement of the PRS may be performed based on the number of reports. As an example, the number of reports may be configured to 1 (one shot measurement report). As an example, the number of reports may be configured to a value of 2 or more (multiple shot measurement report).

At this time, based on the number of reports being configured to 1 and the information on the measurement of the PRS being greater than information that can be transmitted through the preconfigured resource, only some of the information elements representing information on the measurement of the PRS may be transmitted. Specifically, one or more information elements among information elements representing the information on the measurement of the PRS may be determined by the UE. The base station may receive the one or more information elements from the UE. The one or more information elements may be determined based on a predefined priority.

According to one embodiment, the configuration information may include UL grant information. This embodiment may be based on Method 1 described above. Specifically, to reduce latency, uplink resources can be pre-allocated through configuration information related to the measurement gap regardless of whether the terminal transmits a scheduling request. Specifically, uplink resources may be allocated in advance to reduce latency through configuration information related to the measurement gap regardless of whether the UE transmits a scheduling request or not.

According to the above-described S1920, the operation of transmitting configuration information related to the measurement gap to the UE (100/200 in FIGS. 20 to 24) by the base station (100/200 in FIGS. 20 to 24) may be implemented by the device of FIGS. 20 to 24. For example, referring to FIG. 21, one or more processors 202 may control one or more transceivers 206 and/or one or more memories 204 to transmit the configuration information related to the measurement gap to the UE 100.

In S1930, the base station transmits the PRS to the UE based on the measurement gap. The base station may be based on the Reference Source (e.g. Transmission and Reception Point (TRP)) of FIG. 7, and the UE may mean the Target Device of FIG. 7. The PRS may be based on the radio signals of FIG. 7. The S1930 may be based on the operation 2007 of FIG. 16 and the operation 2203 of FIG. 17. Transmission of the PRS may be performed as defined in Tables 6 and 7 above.

The base station may transmit the PRS within a time interval based on the measurement gap. In other words, the measurement of the PRS by the UE may be performed within a time interval based on the measurement gap.

According to the above-described S1930, the operation of transmitting the PRS based on the measurement gap to the terminal (100/200 in FIGS. 20 to 24) by the base station (100/200 in FIGS. 20 to 24) may be implemented by the device of FIGS. 20 to 24. For example, referring to FIG. 21, one or more processors 202 may control one or more transceivers 206 and/or one or more memories 204 to transmit the PRS based on the measurement gap to the UE 100.

In S1940, the base station receives information on the measurement of the PRS from the UE. The S1940 may be based on operations 2009 and 2011 of FIG. 16 and operations 2205 of FIG. 16. That is, the information on the measurement of the PRS may be transmitted from the UE to the location server through the base station (TRP).

Reception of information on the measurement of the PRS may be performed as defined in Table 7 above. As an example, the information on the measurement of the PRS may include Reference Signal Time Difference (RSTD) related to the PRS and/or Reference Signal Received Power (RSRP) related to the PRS.

According to one embodiment, reception of information on the measurement of the PRS may be performed based on a protocol for positioning. As an example, information on the PRS measurement may be received based on LTE Positioning Protocol (LPP).

The information on the measurement of the PRS may be received based on preconfigured resources. The preconfigured resource may be a resource determined/configured based on at least one of Case #1, Case #2, and Method 1 to Method 5 described above.

As an example, the preconfigured resource may be determined based on the configuration information. This embodiment may be based on Method 1 above. Specifically, the configuration information may include UL grant information. The preconfigured resource may be determined based on UL grant information included in the configuration information.

As an example, the preconfigured resources may be based on resources configured for grant-free transmission. This embodiment may be based on Method 2 above. Specifically, the PUSCH resource area may be configured in advance for the grant-free transmission (i.e. UL transmission without resource allocation based on the UL grant). The preconfigured resources may be based on resource(s) within the PUSCH resource area. This embodiment may be performed based on the RRC state of the UE. For example, based on the fact that the RRC state of the UE is RRC inactive state (or RRC idle state), the information on the measurement of the PRS may be received through resources configured for the grant-free transmission. As an example, based on the fact that the RRC state of the UE is RRC connected state, the information on the measurement of the PRS may be received through resources configured for the grant-free transmission.

As an example, Buffer Status Report (BSR) information related to the preconfigured resource may be included in a scheduling request (SR) and received. The preconfigured resources may be determined based on an uplink grant (UL grant) related to the SR. This embodiment may be based on Method 3 above.

As an example, the preconfigured resource may be determined based on an uplink grant (UL grant) received at a predefined time point after the measurement gap. This embodiment may be based on Method 4 above. The predefined time point may be determined based on the measurement gap and a preconfigured offset. The preconfigured offset may be configured in units based on at least one of a symbol, a slot, or a subframe. The value of the preconfigured offset may be configured based on a capability of the UE. The capability of the UE may be related to the time required for operations related to measurement of the PRS.

As an example, the preconfigured resource may be based on a physical uplink control channel (PUCCH) resource for transmission of a scheduling request (SR). This embodiment may be based on Method 5 above.

According to one embodiment, reception of information on the measurement of the PRS may be performed based on the number of reports configured through the configuration information. For example, if the number of reports is 1, reception of information on the measurement of the PRS may be performed only once.

It may be assumed that the number of reports is configured to 1 and information on the measurement of the PRS is greater than information that can be transmitted through the preconfigured resource (i.e. measurement results cannot be transmitted at once through the preconfigured resources). At this time, only some of the information elements representing information on the measurement of the PRS may be received.

Specifically, one or more information elements among information elements representing information on the measurement of the PRS may be determined, and the one or more information elements may be received through the preconfigured resource.

According to the above-described S1940, the operation of receiving information on the measurement of the PRS from the UE (100/200 in FIGS. 20 to 24) by the base station (100/200 in FIGS. 20 to 24) may be implemented by the device of FIGS. 20 to 24. For example, referring to FIG. 21, one or more processors 202 may control one or more transceivers 206 and/or one or more memories 204 to receive the information on the measurement of the PRS from the UE 100.

The method may further include transmitting configuration information related to the PRS. Specifically, the base station transmits configuration information related to the PRS to the UE. As an example, the location server may refer to the Location Management Function (LMF) of FIG. 7. The operation may be based on operations 2003 and 2005 of FIG. 16 and operation 2201 of FIG. 17. The configuration information related to the PRS may be deliver from the location server to the UE through the base station (TRP).

As an example, the configuration information related to the PRS may include DL PRS resource set and/or DL-PRS-Resource, which are upper layer parameters based on Table 7 above. However, it is not limited to this, and the configuration information related to the PRS may further include other upper layer parameters defined in Table 7 above.

The configuration information related to the PRS may be transmitted based on a protocol for positioning. As an example, the configuration information related to the PRS may be transmitted based on LPP (LTE Positioning Protocol).

According to the above-described steps, the operation of transmitting the configuration information related to the PRS to the UE (100/200 in FIGS. 20 to 24) by the base station (100/200 in FIGS. 20 to 24) may be implemented by the device of FIGS. 20 to 24. For example, referring to FIG. 21, one or more processors 202 may control one or more transceivers 206 and/or one or more memories 204 to transmit the configuration information related to the PRS to the UE 100.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 20 illustrates a communication system 1 applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 21 illustrates wireless devices applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 22 illustrates a signal process circuit for a transmission signal.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 23 illustrates another example of a wireless device applied to the present disclosure.

The wireless device may be implemented in various forms according to a use-case/service (refer to FIG. 20). Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 20), the vehicles (100*b*-1 and 100*b*-2 of FIG. 20), the XR device (100*c* of FIG. 20), the hand-held device (100*d* of FIG. 20), the home appliance (100*e* of FIG. 20), the IoT device (100*f* of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 24 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Here, the wireless communication technology implemented in the device (FIGS. 20 to 24) of the present disclosure may include LTE, NR, and 6G as well as Narrowband Internet of Things (NB-IoT) for low-power communication. For example, the NB-IoT technology may be an example of a LPWAN (Low Power Wide Area Network) technology, and may be implemented in standards such as LTE Cat NB1 and/or LTE Cat NB2, and is not limited to the above-described name.

Additionally or alternatively, the wireless communication technology implemented in the device (FIGS. 20 to 24) of the present disclosure may perform communication based on the LTE-M technology. For example, the LTE-M technology may be an example of LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name.

Additionally or alternatively, the wireless communication technology implemented in the device (FIGS. 20 to 24) of the present disclosure may include at least one of ZigBee, Bluetooth, and Low Power Wide Area Network (LPWAN) in consideration of low power communication, and is not limited to the above-described name. For example, the ZigBee technology may generate PAN (personal area networks) related to small/low-power digital communication based on various standards such as IEEE 802.15.4, and may be called by various names.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method comprising:

transmitting, by a user equipment (UE), a message for requesting a measurement gap;

receiving, by the UE, configuration information related to the measurement gap;

receiving, by the UE, a positioning reference signal (PRS) during the measurement gap; and transmitting, by the UE, information for measurement of the PRS, wherein the information for the measurement of the PRS is transmitted on a preconfigured resource, wherein the preconfigured resource is determined based on an UpLink (UL) grant, which is received at a predefined time point after the measurement gap, wherein a frequency resource for the UL grant is defined as a bandwidth part (BWP) in which the PRS is received.

2. The method of claim 1, wherein the configuration information includes information related to the measurement of the PRS, and based on the information related to the measurement of the PRS, a number of PRS resources measured by the UE is limited to a certain number.

3. The method of claim 2, wherein the information related to the measurement of the PRS includes information on at least one of i) maximum or minimum number of the PRS resources, ii) minimum or maximum number of PRS resource sets and/or iii) maximum or minimum number of transmission and reception points (TRPs) related to the PRS.

4. The method of claim 1, wherein the configuration information includes information representing a number of reports of the information for the measurement of the PRS, and transmission of the information for the measurement of the PRS is performed based on the number of reports.

5. The method of claim 4, wherein, based on the number of reports being configured to 1 and the information for the measurement of the PRS being greater than information that can be transmitted through the preconfigured resource:

one or more information elements among information elements representing the information for the measurement of the PRS are determined, and the one or more information elements are transmitted through the preconfigured resource.

6. The method of claim 5, wherein the one or more information elements are determined based on a predefined priority.

7. The method of claim 1, wherein the predefined time point is determined based on the measurement gap and a preconfigured offset.

8. The method of claim 7, wherein the preconfigured offset is configured in units based on at least one of a symbol, a slot, or a subframe.

9. The method of claim 7, wherein a value of the preconfigured offset is configured based on a capability of the UE, and wherein the capability of the UE is related to time required for operations related to the measurement of the PRS.

10. A user equipment (UE) comprising:

one or more transceivers;

one or more processors controlling the one or more transceivers; and one or more memories operably connected to the one or more processors, wherein the one or more memories store instructions for performing operations based on being executed by the one or more processors, wherein the operations include:

transmitting a message for requesting a measurement gap;

receiving configuration information related to the measurement gap;

receiving a positioning reference signal (PRS) during the measurement gap; and transmitting information for measurement of the PRS, wherein the information for the measurement of the PRS is transmitted on a preconfigured resource, wherein the preconfigured resource is determined based on an UpLink (UL) grant, which is received at a predefined time point after the measurement gap, wherein a frequency resource for the UL grant is defined as a bandwidth part (BWP) in which the PRS is received.

11. A base station comprising:

one or more transceivers;

one or more processors controlling the one or more transceivers; and one or more memories operably connected to the one or more processors, wherein the one or more memories store instructions for performing operations based on being executed by the one or more processors, wherein the operations include:

receiving a message for requesting a measurement gap;

transmitting configuration information related to the measurement gap;

transmitting a positioning reference signal (PRS) during the measurement gap; and receiving information for measurement of the PRS, wherein the information for the measurement of the PRS is received on a preconfigured resource, wherein the preconfigured resource is determined based on an UpLink (UL) grant, which is transmitted at a predefined time point after the measurement gap, wherein a frequency resource for the UL grant is defined as a bandwidth part (BWP) in which the PRS is transmitted.

* * * * *